(12) United States Patent
Searles

(10) Patent No.: US 9,272,751 B2
(45) Date of Patent: Mar. 1, 2016

(54) ELECTRICALLY ASSISTED CYCLE KIT

(71) Applicant: Modern Times Ltd., Hampshire (GB)

(72) Inventor: Mark Aubrey Searles, Ampfield (GB)

(73) Assignee: Modern Times Ltd., Hampshire (GB)

(*) Notice: Subject to any disclaimer, the term of this patent is extended or adjusted under 35 U.S.C. 154(b) by 94 days.

(21) Appl. No.: 13/869,412

(22) Filed: Apr. 24, 2013

(65) Prior Publication Data

US 2013/0311020 A1 Nov. 21, 2013

(30) Foreign Application Priority Data

Apr. 24, 2012 (GB) .................................. 1207184.1

(51) Int. Cl.
*B62M 6/50* (2010.01)
*F16M 13/02* (2006.01)

(52) U.S. Cl.
CPC ............... *B62M 6/50* (2013.01); *F16M 13/022* (2013.01); *Y10T 29/49002* (2015.01)

(58) Field of Classification Search
CPC .. B62M 6/50; F16M 13/022; Y10T 29/49002
USPC .......................... 701/22; 248/205.1; 29/592.1
See application file for complete search history.

(56) References Cited

U.S. PATENT DOCUMENTS

| | | | |
|---|---|---|---|
| 5,257,540 A | | 11/1993 | Bower et al. |
| 5,474,148 A | * | 12/1995 | Takata ........................ 180/206.2 |
| 5,539,988 A | * | 7/1996 | Braun ......................... 33/203.19 |
| 5,681,234 A | * | 10/1997 | Ethington ........................ 474/70 |
| 5,922,035 A | * | 7/1999 | Chen ................................ 701/22 |
| 6,012,538 A | * | 1/2000 | Sonobe et al. ................. 180/220 |
| 6,607,327 B1 | * | 8/2003 | Ho ............................... 403/322.1 |
| 6,629,574 B2 | * | 10/2003 | Turner ....................... 180/206.4 |
| 6,672,418 B1 | * | 1/2004 | Makino ....................... 180/206.3 |
| 6,957,129 B2 | * | 10/2005 | Hatanaka et al. .................. 701/1 |
| 7,040,771 B2 | * | 5/2006 | McGuinness ................. 359/842 |
| 8,831,907 B2 | * | 9/2014 | Bertolotti et al. ............. 702/151 |
| 9,027,691 B2 | * | 5/2015 | Ishida et al. ............... 180/206.3 |
| 2003/0132602 A1 | * | 7/2003 | Miyoshi ........................ 280/276 |
| 2003/0141126 A1 | * | 7/2003 | Hays ........................ B62M 6/45 180/206.4 |

(Continued)

FOREIGN PATENT DOCUMENTS

| | | |
|---|---|---|
| DE | 20007984 | 5/2000 |
| DE | 20007984 U1 * | 9/2000 |
| GB | 2376931 | 12/2002 |
| WO | 03/041983 | 5/2003 |
| WO | 03/041983 A1 | 5/2003 |

OTHER PUBLICATIONS

Search Report for corresponding GB Application No. 1207184.1 dated May 2, 2012.

(Continued)

*Primary Examiner* — Calvin Cheung
*Assistant Examiner* — Angelina Shudy
(74) *Attorney, Agent, or Firm* — Renner, Otto, Boisselle & Sklar, LLP

(57) ABSTRACT

An electrically assisted cycle kit (50) for fitting to a pedal cycle (2) comprises an electric motor (58) for assisting pedal cycle motion, a battery (52) for powering the motor (58), and a controller (60) for controlling the drive of the motor (58). A gear tooth sensor (65) provides a gear motion signal indicative of the speed/acceleration of motion of gear teeth (94) and valleys (95) of a gear sprocket (32) of the cycle. The controller controls the drive of the motor (58) in dependence on the gear motion signal.

20 Claims, 20 Drawing Sheets

(56) References Cited

U.S. PATENT DOCUMENTS

| | | | |
|---|---|---|---|
| 2007/0044586 A1* | 3/2007 | Ishikawa | 74/551.8 |
| 2008/0071436 A1* | 3/2008 | Dube et al. | 701/22 |
| 2009/0319203 A1* | 12/2009 | Kalliomaki et al. | 702/44 |
| 2011/0160945 A1* | 6/2011 | Gale | 701/22 |
| 2011/0238250 A1* | 9/2011 | Takao | 701/22 |
| 2012/0109436 A1* | 5/2012 | Saida | 701/22 |

OTHER PUBLICATIONS

Extended European Search Report for corresponding Application No. 13164851.1 dated Jul. 1, 2013.

European Office Action for corresponding Application No. 13164851.1 dated Sep. 29, 2015.

* cited by examiner

ELECTRICALLY ASSISTED CYCLE KIT

BACKGROUND OF THE INVENTION

1. Field of the Invention

The present invention relates to the field of pedal cycles. More particularly, the invention relates to an electrically assisted cycle kit for fitting to a pedal cycle, a pedal cycle fitted with the kit, a method of fitting the kit to the pedal cycle, and an attachment for attaching an object to a pedal cycle.

2. Introduction

Electrically assisted pedal cycles include an electric motor for assisting with pedal cycle motion of the cyclist. The drive of the motor is typically controlled based on the pedalling speed of the cyclist, so that the motor provides assistance when the cyclist is pedalling but does not drive when the cyclist brakes or stops pedalling. To enable safe regulation of the drive of the motor, the cycle is typically provided with sensors for sensing the speed at which the cyclist is pedalling. Various kinds of sensors may be used to sense the pedalling speed, including simple proximity switches which sense a magnet fixed to a rotating target (e.g. a wheel) on each rotation of the target; Hall sensors which sense a number of magnetic targets arranged on a specially made target disc fitted to the wheel of the cycle; and light sensors where a disk with holes is used so that light can be detected through each target hole.

The key disadvantage of such sensors is that they require a manufactured target device to be made in each case and fixed accurately and robustly to the pedal cycle for it to work. Given the very wide range of pedal cycle configurations possible, satisfying every eventuality is very difficult and fitting is not easy. While proximity sensors using a single magnetic target may be easier to fit than the other kinds of sensors and targets, the proximity sensors cannot determine the direction of rotation, which is important for electrically assisted pedal cycles. Other sensors have limits on the number of targets that can realistically be placed on a disc and fitted to any pedal cycle. The resulting limited number of targets limits sensitivity and this can create difficulties in complying with international standards for electric bicycles. Consequently many quality electric bicycle manufacturers use torque sensors which are very difficult to retro-fit to pedal cycles and often result in highly variable power assistance.

Therefore, the present invention seeks to provide an electrically assisted cycle kit which provides high quality sensing of the pedalling of the cyclist, while being easy to fit to a pedal cycle, even if fitted by someone who is not an expert.

SUMMARY OF THE INVENTION

Viewed from one aspect, the present invention provides an electrically assisted cycle kit for fitting to a pedal cycle, the kit comprising:

an electric motor for assisting pedal cycle motion of the pedal cycle;

a battery for powering the electric motor;

a gear tooth sensor for providing a gear motion signal indicative of at least one of a speed of motion and an acceleration of motion of gear teeth and valleys of a gear sprocket of the pedal cycle relative to the gear tooth sensor; and a controller for controlling the drive of the electric motor in dependence on the gear motion signal provided by the gear tooth sensor.

The present technique provides an electrically assisted cycle kit for fitting to a pedal cycle in order to convert it into an electrically assisted pedal cycle. A battery is provided for powering an electric motor to provide assistance to the cyclist's pedalling. The battery and motor can be fitted to an existing cycle together with a controller for controlling the drive of the electric motor. A gear tooth sensor is provided for sensing the motion of gear teeth and valleys of a gear sprocket of the pedal cycle relative to the gear tooth sensor. The gear tooth sensor provides a gear motion signal indicative of the speed and/or acceleration of motion of the gear teeth and valleys. Since the gear sprockets rotate at a rate proportional to the speed of pedalling (dependent on gearing), the gear motion signal is representative of the pedalling speed and can be used by the controller to control the motor drive.

Using a gear tooth sensor to regulate the drive of the electric motor provides several advantages. The gear tooth sensor does not rely on a specialised sensing target being fitted to the cycle. Instead, the existing gear sprocket of the pedal cycle acts as the target. This reduces the number of components that need to be fitted to the cycle and aligned correctly, simplifying fitting of the kit.

Also, the gear sprockets of the cycle typically have a relatively large number of teeth and valleys, larger than the number of targets which could realistically be used with the types of sensors discussed above. Therefore, the gear sprockets can provide many sensing targets per rotation, enabling highly sensitive detection of changes in the cyclist's pedalling speed. A few teeth and valleys, representing a fraction of a full rotation of the sprocket, can be enough to sense that the cyclist has increased or decreased his/her pedalling speed. This enables the controller to control the drive of the motor to respond more quickly to changes in the pedalling speed.

Also, to allow an electrically assisted cycle to stop safely when the cyclist brakes, existing cycles are typically provided with a brake sensor for sensing actuation of the brake levers. However, such brake sensors are often complicated to fit and unreliable. Since the gear tooth sensor is able to sense many targets per rotation and so respond more quickly to changes in pedalling speed, the brake sensor becomes unnecessary, since ceasing or slowing of pedalling during braking can be detected very quickly by the gear tooth sensor. By eliminating the brake sensor, the number of components to be fitted is reduced, and so fitting of the cycle kit to the cycle becomes easier.

The gear tooth sensor may comprise a magnetic sensor for sensing ferrous gear teeth of the gear sprocket. For example, the sensor may comprise a Hall sensor with a back-biasing magnet. Counter-intuitively, even though cycles are not generally designed to have magnetic components, the gear sprockets often are magnetic since they tend to be made of ferrous material. Virtually all pedal cycles have some ferrous rear sprockets, because the sprockets tend to be subjected to significant wear (especially the smaller sprockets), and ferrous material tends to last longer than other non-ferrous materials. Some cycles may also have ferrous front sprockets. Therefore, the magnetic gear tooth sensor can be fitted to virtually all pedal cycles without the need for a special sensing target to be fitted.

The motor may be controlled in various ways. In one example, the controller controls the drive speed of the electric motor in dependence on the gear motion signal provided by the gear tooth sensor. For example, the controller may set a target drive speed for the electric motor as a function of the speed of motion of the gear teeth and valleys indicated in the gear motion signal. The function may be non-linear or linear for example. In other examples, the controller may control the drive current supplied to the electric motor based on the gear motion signal. The electric motor may be a hub motor driving one of the wheels or a motor designed to drive the existing human powered drive elements of the bicycle such as the crank, front sprockets or chain. A brushless sensorless hub motor is particularly preferred because it is inexpensive, light, efficient and quick and easy to fit to a wide range of cycles.

The controller may determine the acceleration of motion of the gear teeth and valleys based on the gear motion signal, and use the detected acceleration (or deceleration) to control the drive of the electric motor. This enables the controller to control the motor to react quickly to changes in the pedalling speed of the cyclist.

The gear motion signal may also be indicative of the direction of rotation of the gear sprocket. The drive of the electric motor may be controlled in dependence upon the direction of rotation indicated by the gear motion signal. This can be used to ensure that the motor only provides assistance if pedalling is in a forward direction. Some cycles use reverse pedal motion to control brakes, and so the direction detection can be used in such cycles to sense braking and hence control the electric motor to stop driving.

One way to sense the direction of rotation using the gear tooth sensor is to provide the sensor with at least a first sensor and a second sensor spaced apart from one another. Each sensor may independently sense the motion of the gear teeth and valleys of the gear sprocket, and the respective sensing signals generated by each sensor may be used to determine the direction of rotation. By spacing the first and second sensors apart, the sensors can be arranged to detect the passage of the gear teeth/valleys at slightly different times, and the relative timings at which the sensors detect the teeth/valleys can be used to determine the direction of rotation.

Hence, the gear tooth sensor enables the speed, acceleration and direction of motion of the gear sprocket to be determined using a single sensor, and without needing to fit a special target to the cycle. This, combined with the removal of the requirement for brake sensors, greatly simplifies fitting of the cycle kit to the cycle.

The controller may start the drive of the electric motor in response to detecting a drive start condition based on the gear motion signal. Many different drive start conditions may be used, including at least one of the following:

(i) detecting rotation of the gear sprocket in a forward direction (i.e. in a direction corresponding to forward pedalling by the cyclist). It is not desirable for the motor to provide power assistance when the cyclist is pedalling backwards, as reverse pedalling can indicate braking in a cycle fitted with reverse-pedal brakes and providing power assistance during reverse pedalling in many cases would not comply with international regulations.

(ii) after determining the direction of rotation of the gear sprocket at A instances over a period of operation, detecting forward rotation of the gear sprocket for at least B of the A instances, where A and B are integers and A>B.

It may be desirable to drive the motor even if continuous forward pedalling is not detected. For example, as the cyclist's pedalling may not be uniform, or the cycle may encounter bumps which cause the pedals to temporarily jolt backwards, then even when pedal motion is generally in the forward direction there may still be some instances where the gear tooth sensor detects that the gear sprocket has stopped rotating or is rotating in the reverse direction. To ensure that the motor continues to operate correctly despite such momentary glitches, the controller can measure a number of instances of the rotation of the gear sprocket over a period of operation, and apply motor drive if forward rotation of the gear sprocket is detected for at least a given proportion of those instances (for example, B out of A instances). In this way, the odd rogue detection of no rotation or backward rotation of the gear sprocket can be ignored when the general trend is detection of forward motion.

Note that the A instances for which the controller checks the direction of rotation may either be a predetermined number of instances (e.g. the controller may check the most recent 6 readings of the direction of rotation), or may be the number of instances measured in a predetermined period of time (e.g. 0.5 of a second). Also, the controller may also demand that the A instances take place within a given predetermined period of time (e.g. 8 readings within 0.6 of a second), so that if not enough readings take place within that time then further instances occurring later are not taken into account (insufficient instances within a given period of time would generally indicate that the gear sprocket is rotating too slowly for motor drive to be applied). Hence, there are a number of ways in which the A instances could be chosen.

(iii) detecting that the speed of motion of the gear teeth and valleys is greater than a start threshold speed. It may not be desirable to apply motor drive when pedalling speed is very low. For example, the user may simply be moving the pedals round gently when stationary to put the pedals in a better position for setting off, in which case motor drive would be undesirable. Therefore, the controller may ensure that motor drive only starts when the speed rises above a start threshold speed.

(iv) after determining the speed of motion of the gear teeth and valleys at C instances over a period of operation, detecting that the speed of motion of the gear teeth and valleys is greater than a start threshold speed for at least D of the C instances, where C and D are integers and C>D.

In a similar way to discussed above, the controller may determine the speed of motion at several instances over a period of time and control the motor to apply drive when a given proportion (D out of C) of the speed readings indicate a speed higher than the start threshold speed. This prevents an anomalous result, when the speed momentarily drops, from affecting the motor drive control.

(v) detecting acceleration of motion of the gear teeth and valleys.

Motor drive can also be started when acceleration of motion is detected by the gear tooth sensor. This enables quick actuation of the motor to provide a boost when the cyclist is setting off.

It will be appreciated that these conditions may be used individually, or in combination such that if any one or more of these conditions is detected then the motor drive is started.

Similarly, the controller may be arranged to stop the drive of the electric motor in response to detecting a drive stop condition based on the gear motion signal. The drive stop condition may include at least one of:

(i) detecting backward rotation of the gear sprocket (i.e. rotation in a direction corresponding to backward pedalling). Since backward rotation of the gear sprocket may indicate braking, it is desirable to stop the motor drive in this case.

(ii) after determining the direction of rotation of the gear sprocket at W instances over a period of operation, detecting backward rotation of the gear sprocket for at least X of the W instances, where W and X are integers and W>X.

In a similar way to discussed above for starting the motor drive, the controller may monitor the direction of rotation of the sprocket at a number of instances over a given period of time and stop the motor drive when a given proportion of the instances indicate backward rotation. In this way, anomalous determinations of forward rotation (e.g. due to bumps to the cycle) can be ignored.

(iii) detecting that the speed of motion of the gear teeth and valleys has dropped to a stop threshold speed;

Hence, when the pedalling speed drops to a low level, motor drive can be halted. The stop threshold speed may be zero or may be non-zero.

(iv) after determining the speed of motion of the gear teeth and valleys at Y instances over a period of operation, detecting that the speed of motion of the gear teeth and valleys has dropped to a stop threshold speed for at least Z of the Y instances, where Y and Z are integers and Y>Z.

Again, rogue speed readings can be accounted for by stopping the motor drive if at least a proportion of speed determinations indicate a speed at or below the stop threshold speed (it is not necessary for all the instances to be at or below the threshold speed).

(v) detecting deceleration of motion of the gear teeth and valleys. This enables the motor drive to be stopped quickly when the cyclist reduces the pedalling speed or brakes.

Note that in some embodiments the sensing of the drive start condition and the sensing of the drive stop condition may be a single sensing operation. For example, sensing of the direction of rotation may be performed, with motor drive being applied when forward rotation is detected and motor drive being stopped when forward rotation is not detected. Similarly, the controller may detect the proportion of speed readings in a given time which indicate a speed greater than a threshold speed, with motor drive being applied if there is greater than a given proportion of speed readings higher than the threshold, and motor drive being stopped otherwise. Therefore, while there may be different conditions for starting and stopping the motor drive, these conditions may be detected using a single sensing operation.

In some embodiments different thresholds may be set for starting and stopping the motor drive. For example, since stopping the cycle quickly is more safety critical than starting the cycle quickly, it may be desirable to be able to provide more rapid stopping of the motor drive than starting of the motor drive. Therefore, the values A, B, C, D, W, X, Y, Z discussed above could be set to different levels for the drive start condition and the drive stop condition. For example, when starting the motor the controller could require that 6 instances of forward rotation are detected out of 8 readings made within 0.6 of a second, while when the motor is already driving the controller could stop the motor drive if less than 4 instances of forward rotation are detected out of 6 readings within 0.4 seconds.

The gear motion signal generated by the gear tooth sensor may have different forms. In one example, the gear tooth sensor may generate an oscillating gear motion signal in response to the motion of the gear teeth and valleys relative to the gear tooth sensor. As the gear teeth and valleys pass the sensor, the signal may be switched between high and low values with an oscillation period corresponding to the interval between successive gear teeth. The controller may determine the speed and/or acceleration of motion of the gear teeth and valleys in dependence on either the oscillation period or the oscillation frequency of the gear motion signal.

In other examples, the gear motion signal generated by the sensor may indicate the speed, acceleration or direction of motion more directly. For example, the gear tooth sensor may have internal circuitry for determining parameters such as the speed, acceleration or direction of motion of the gear teeth and valleys, and the gear motion signal provided to the controller may indicate these parameters. Also, in some embodiments, the gear tooth sensor and controller may be integrated within a single unit so that the integrated unit detects and processes the gear motion signal and controls the motor drive of the electric motor.

Without calibration, the motion speed of the gear teeth and valleys detected by the gear tooth sensor is a relative speed from which changes in the pedalling speed can be detected. This may be enough for sensing acceleration or deceleration by the pedal cyclist and to confirm that the pedal cyclist is still pedalling and therefore to control the motor drive.

However, in order to sense an absolute pedalling speed, the controller can be calibrated with the number of teeth on the gear sprocket being sensed. If the gear sprocket is visible and rotates at the same rate as the wheel then the user of the bike or the installer of the cycle kit may simply input the number of teeth on the sprocket being sensed. This enables the controller to detect each complete rotation of the sprocket by determining when the calibrated number of teeth have passed the gear tooth sensor. Such calibration is suitable for derailleur equipped cycles or fixed wheel and single speed cycles, where the rear sprocket rotates at the same rate of the wheel during pedalling and so a full rotation of the wheel corresponds to the total number of teeth on the gear sprocket.

However, this is not possible for all cycles. For cycles with hub gears, for example, the gear may be changed after the hub gear sprocket being sensed so that the hub gear sprocket rotates at a different rate to the wheel. This means that the number of teeth detected during a full rotation of the wheel may not be the same as the total number of teeth on the gear sprocket being sensed and may change depending on which gear has been selected.

Therefore, the kit may be provided with a sensing target for attaching to a rotating element of the cycle and a proximity sensor providing a proximity signal in response to sensing proximity of the sensing target to the proximity sensor. For example, the sensing target may be a magnet which can be attached to part of the rotating wheel (e.g. a spoke). The proximity sensor may then indicate each time the target passes the proximity sensor corresponding to one full rotation of the wheel, and this can be used in calculating the speed of the pedal cycle where the sprocket being sensed does not necessarily rotate at the speed of the wheel, as in a hub gear equipped pedal cycle. In this case, the gear tooth sensor could also help determine which gear the hub gear is using based on the number of teeth sensed for each full rotation of the wheel as indicated by the proximity sensor. Also, for pedal cycles where the sensed sprocket does rotate at the speed of the wheel, by counting the number of gear teeth which have been sensed between successive passes of the sensing target, the controller can automatically determine the number of teeth on the gear sprocket corresponding to a full rotation of the wheel, even if the number of teeth on the gear sprocket cannot be determined manually.

Once the number of gear teeth is known, the controller can detect each full rotation of the wheel for pedal cycles where the sprocket sensed rotates at the speed of the wheel. If the controller is also provided with the radius, diameter or circumference of the cycle wheel, then the absolute speed of the cycle when pedalling can also be determined based on the speed of rotation of the sprocket. This can be useful for controlling the drive of the electric motor to ensure compliance with international standards, which for safety generally demand that no electric assistance is applied when above a certain maximum speed or when the cyclist is not pedalling. The cycle speed can also be used by a cycle computer or similar device for gathering cycle statistics about the cyclist's journey and performance.

Hence, the controller may determine the speed of the cycle either based on the gear tooth sensor or based on the proximity sensor. The controller may reduce the drive of the electric motor in response to detecting that the speed of the cycle has risen to a threshold speed. International safety regulations generally demand that no electrical assistance is applied once the cycle reaches a given speed. Therefore, the motor drive can be reduced when a threshold speed is reached. To avoid the cyclist perceiving a sudden reduction in motor drive, the threshold may be set slightly below the maximum allowable speed and the motor drive may be reduced gradually to zero so that the motor drive is stopped by the time the cyclist reaches the maximum allowable speed.

The kit may have attachments for attaching the motor, the battery, the gear tooth sensor and the controller to the pedal cycle. These elements may be connected to a variety of locations on the cycle. Wires and connectors may also be provided for providing electrical connections between the various elements.

The kit may include a sensor attachment for attaching the gear tooth sensor to the frame of the pedal cycle. For example, the gear tooth sensor may be attached to a chain stay of the cycle in the vicinity of either the front chain ring (front sprockets) or rear sprockets. To accommodate a variety of different cycle configurations, the sensor attachment may be adjustable so that the attachment can attach to different shapes and sizes of frame and the sensor itself can be manoeuvred into position near the rear or front sprockets. Hence, the sensor attachment enables universal fitting of the sensor to a cycle frame. By attaching the sensor to the frame when sensing a rear sprocket, the wheel can be removed from the cycle without needing to remove the gear tooth sensor.

In particular, the sensor attachment may comprise a sensor housing configured to house the gear tooth sensor, a support platform for attaching to the frame of the pedal cycle, and a support arm for connecting the sensor housing to the support platform. The support platform enables the sensor to be securely fastened to the frame, while the support arm extends away from the platform to enable the sensor housing to be located in the vicinity of a gear sprocket.

The support arm may be adjustable to permit at least one of: rotation of the sensor housing relative to the support arm, sliding of the sensor housing along the support arm, rotation of the support platform relative to the support arm, and sliding of the support platform along to the support arm. By providing the support arm with one or more degrees of freedom, the position of the sensor housing relative to the sensor support platform can be adjusted to accommodate a range of different cycle configurations. This makes it very easy to fit the sensor to any cycle. If desired, the arm may also be provided in two or more parts with the different parts of the arm being adjustable relative to each other.

The support platform may also be formed with a base portion which attaches to the frame and a pivoting portion which connects to the support arm. The pivoting portion may be pivotable relative to the base portion. This enables the angle at which the support arm extends relative to the frame to be adjusted to accommodate different cycle configurations. For example, by allowing the pivoting portion to pivot relative to the frame to which the base portion is to be attached, the pivoting portion bearing the support arm can swing out from the frame to enable the sensor housing to be moved away from the frame towards the gear sprockets.

The sensor attachment may have a plurality of pivotable gripping members having a gripping surface for gripping the frame of the cycle. Since the gripping members pivot, they can grip round frames of different shapes and sizes, making it easier to fit the gear tooth sensor to any type of cycle. Also, since there are multiple gripping members, the sensor attachment can contact the frame at multiple points, improving the grip of the sensor attachment on the frame.

The gripping members may have a concave gripping surface. This is useful because a concave surface can contact the frame at multiple points along the curved surface, increasing the grip achieved by the sensor attachment in comparison to a straight or convex surface. It will be appreciated that the concave surface does not necessarily need to form a regular curve (although in some embodiments it may do)—it may simply provide a generally hollowed internal region which extends inwards between the edges of the surface.

At least the gripping surface of the gripping members may be made from a slip-resistant material, such as rubber. For example, a thin adhesive foam rubber sheet may be applied to the gripping surface of the gripping members to provide some adhesion to the frame of the cycle. By providing a slip-resistant material which makes the gripping surface slightly tacky or frictioned, the sensor attachment can be held firmly in place without slippage.

The gripping members may also have a non-gripping surface which has a groove for accommodating a securing strap. This enables a flexible strap such as a cable tie or wire to bind the gripping members to the frame, with the groove preventing the strap slipping laterally off the gripping members. A further groove may be provided in the support platform base unit to line up with the grooves in the gripping members. When the securing strap(s) are tightened the attachment becomes a solid unit conformed to the shape of the frame and where the frame is non-circular in section the bracket is prevented from slipping around the cross section mechanically. Friction force prevents slipping due to the increased number of contact points, and the wider rigid attachment provided by the pivotable gripping members when the straps are tightened prevents rocking.

Hence, the sensor attachment described above enables the gear tooth sensor to be securely and rigidly fastened to the frame to prevent slippage and rocking, which improves the accuracy of the gear tooth sensing (movement of the sensor relative to the gear sprockets could cause false detection of motion of the teeth).

Alternatively the gear tooth sensor may be fastened to a rear axle of the pedal cycle. Hence, the sensor attachment may include a support hook or ring which attaches around the rear axle of the cycle, an arm connected to the support hook or ring, and a sensor housing which houses the gear tooth sensor and is connected to the end of the arm. If desired, the arm may be provided in two or more parts with the different parts of the arm being adjustable relative to each other. The advantage of this type of attachment is that the sensor can stay in the same position relative to the gear sprocket even if the wheel is removed from the cycle, since the sensor remains aligned to the axle. A detachable connector can be used to allow the wire connecting the sensor to the controller to be removed when the sensor is removed together with the wheel, or the use of a hook or other quick release mechanism can be used to ensure that the sensor will remain attached to the bike via the cable when the wheel is removed.

Viewed from another aspect, the present invention provides a pedal cycle which is fitted with the electrically assisted cycle kit as described above. The motor may be attached to a wheel of the cycle (typically the front wheel, since the front wheel is easier to fit a motor to as it does not have any sprockets). The battery may be attached at any point of the bike, but may be conveniently located on the down tube or seat tube of the frame of the cycle. The controller may be fitted to any part of the cycle. The gear tooth sensor may be fitted as described above using a sensor attachment to the frame or rear axle of the cycle.

It can be particularly useful to fit the gear tooth sensor to a chain stay of the pedal cycle. In this way, the sensor does not need to be removed when the rear wheel of the cycle is removed. A chain stay mounted gear tooth sensor is capable of sensing both the front and rear sprockets (the front sprockets may also be referred to as front chain rings).

Viewed from another aspect, the present invention provides a method of fitting an electrically assisted cycle kit to a pedal cycle, the method comprising:

attaching an electric motor to the pedal cycle for assisting pedal cycle motion of the pedal cycle;

attaching a gear tooth sensor to the pedal cycle for providing a gear motion signal indicative of a speed of motion of gear teeth and valleys of a gear sprocket of the pedal cycle relative to the gear tooth sensor;

attaching a controller to the pedal cycle and connecting the controller to the electric motor and the gear tooth sensor for controlling the drive of the electric motor in dependence on the gear motion signal provided by the gear tooth sensor; and attaching a battery to the pedal cycle and connecting the battery for powering the electric motor, the gear tooth sensor and the controller.

Viewed from a further aspect, the present invention provides an attachment for attaching an object to a pedal cycle, comprising a support platform for attaching to a frame of the pedal cycle, wherein the object is connectable to the support platform;

wherein the support platform comprises a plurality of gripping members, the gripping members having a gripping surface for gripping the frame of the pedal cycle and a non-gripping surface comprising a groove for accommodating a securing strap.

The attachment described above may also be used for attaching other objects to a pedal cycle. The gripping members, which may be pivotable, have a groove on the non-gripping surface for binding a strap round the gripping members and enable attachment to a wide variety of different frame shapes and sizes. For example, objects such as a water bottle or air pump may be attached to the frame using the attachment. The support platform, support arm and gripping members may be arranged as discussed above for the gear tooth sensor attachment (with the platform having a base portion and pivotable portion as described above).

The above, and other objects, features and advantages of this invention will be apparent from the following detailed description of illustrative embodiments which to be read in connection with the accompanying drawings.

DESCRIPTION OF EMBODIMENTS

Figure 1:
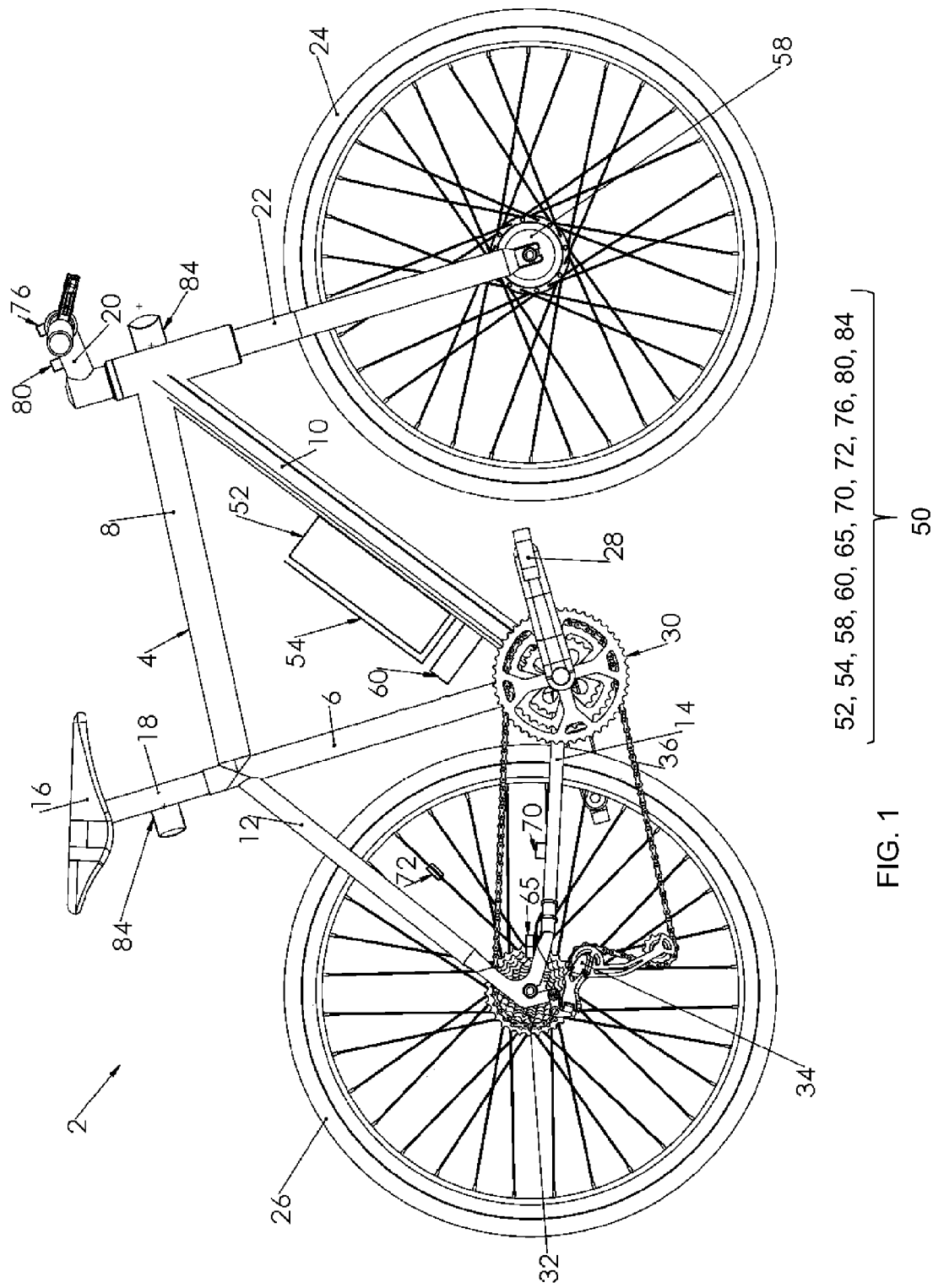
FIG. 1 schematically illustrates a pedal cycle fitted with an electrically assisted cycle kit.

FIG. 1 schematically illustrates a pedal cycle 2. While FIG. 1 shows a typical pedal bicycle, it will be appreciated that the present technique could also be applied to other types of cycles such as a tricycle or a tandem. The pedal cycle 2 may be an existing cycle for which no electrical assistance is originally provided. The pedal cycle 2 comprises a frame 4 including a seat tube 6, top tube 8, down tube 10, seat stays 12, and chain stays 14. The cycle 2 also includes a saddle 16, seat post 18, handle bars 20, front fork 22, front wheel 24, rear wheel 26, pedals 28, front sprockets or chain rings 30, rear sprockets 32, derailleur 34 and chain 36.

To provide assistance with pedal cycle motion, the cycle 2 is fitted with an electrically assisted cycle kit 50. The kit 50 is shown functionally in FIG. 2 and shown fitted to the cycle 2 in FIG. 1. By fitting the components of the cycle kit 50 to the cycle 2, a standard cycle 2 can be converted into an electrically assisted cycle. The cycle kit 50 includes a battery 52 for providing power to the other elements of the cycle kit 50. In FIG. 1, the battery 52 is shown mounted in a cage 54 connected to the down tube 10 of the frame 4, in a similar way to a cage for a water bottle. In other examples, the battery may be connected to other portions of the frame 4 (for example, the seat tube 6) and need not be formed in the shape of a water bottle. The kit 50 is also provided with a battery charger 56 for recharging the battery 52.

The kit 50 also includes an electric motor 58 for providing electrical assistance for pedal cycle motion. In the example of FIG. 1, the motor 58 is a hub motor fitted to the front wheel 24 of the cycle 2, but in other embodiments a crank drive motor or a rear wheel drive motor can be used. A brushless sensorless hub motor is particularly preferred for its reliability, low cost and efficient operation. Also, the motor could be a direct drive motor, or a motor with gearing inside a hub (e.g. planetary gearing) to match the speed needed for cycling.

The cycle kit 50 also includes a controller 60 for controlling the operation of the various components of the cycle kit 50. The controller 60 controls the drive of the electric motor 58. In the example shown in FIG. 1, the controller 60 is mounted on the down tube 10, but it will be appreciated that the controller 60 may be located at any location on the cycle 2. The controller 60 may also be integrated into one of the other elements of the cycle kit 50 if desired (for instance, within the housing of the battery 52, the battery cage 54 or the motor 58).

A gear tooth sensor 65 is provided for sensing motion of the teeth and valleys of a gear sprocket 32 of the cycle 2. In the example of FIG. 1, the gear tooth sensor 65 is mounted on the chain stay 14 of the frame 4 to sense the motion of one of the rear sprockets 32. However, in other embodiments the gear tooth sensor 65 may be mounted to a different part of the frame or to the rear axle of the cycle 2, and may sense motion of one of the front chain rings 30 instead of the rear sprockets 32. Preferably, the gear tooth sensor 65 may be fitted to sense the teeth and valleys of the largest rear sprocket 32. This is useful since the largest rear sprocket 32 has more teeth and valleys than the other sprockets and so the gear tooth sensor 65 can detect changes in pedalling speed and acceleration with greater sensitivity. However, other sprockets may also be used, for example if the largest sprocket is not ferrous (typically smaller sprockets are more likely to be ferrous because they experience wear), or if using a smaller sprocket makes it easier for the sensor 65 to be positioned so that it does not get in the way of the chain 36.

The gear tooth sensor 65 provides a gear motion signal to the controller 60 and the controller 60 controls the drive of the electric motor 58 based on the gear motion signal. The speed/acceleration of motion of the teeth and valleys of the gear sprocket 32 is representative of the speed/acceleration of pedalling by the cyclist, since the sprocket 32 rotates at a rate proportional to the rotation rate of the pedals 28. Therefore, by controlling the motor drive based on the sensed speed/acceleration of motion of the gear sprocket 32, the assistance provided by the motor 58 can be controlled in a way that is appropriate to the cyclist's pedalling.

The gear tooth sensor 65 may be a magnetic sensor which senses the ferrous teeth of the sprocket 32. The gear tooth sensor may include a Hall sensor which uses the Hall effect to sense changes in a local magnetic field caused by ferrous objects.

The electrically assisted cycle kit 50 may also be provided with proximity sensor 70 and a sensor target 72. The proximity sensor 70 may be a reed switch or magnetic Hall sensor which provides a proximity signal to the controller 60 indicating whether the sensor target 72 is in proximity to the proximity sensor 70. For example, the sensor target 72 may be a simple magnet which is attached to a rotating part of the cycle, such as a spoke of the rear wheel 26 as shown in FIG. 1. The proximity sensor 70 may be mounted at a position on the cycle 2 which the sensor target 72 will pass as the wheel rotates. In example of FIG. 1, the proximity sensor 70 is mounted on the chain stay 14 of the frame 4. On each rotation of the rear wheel 26, the sensor target 72 will pass the proximity sensor 70 once. The controller 60 may use the proximity signal to identify each complete rotation of the wheel, and by determining the number of teeth that have been sensed between two successive sensing events of the sensor target 72, the controller 60 can determine the number of gear teeth of the sprocket 32 being sensed by the gear tooth sensor 65. This can then be used to determine the speed of the cycle 2 when the cyclist is pedalling from the gear tooth sensor 65. It will be appreciated that if the controller 60 is calibrated with the number of gear teeth of the sprocket 32 being sensed by the gear tooth sensor 65, then the proximity sensors and the sensor target 72 may be omitted. However, in some cycles, such as cycles using hub gears, one rotation of the rear wheel 26 may not represent one rotation of the sprocket 32, and so the proximity sensor 70 can be useful for sensing the speed of such cycles. If fitted the proximity sensor 70 can in any event continue to provide cycle speed data at all times whilst that cycle 2 is in motion, for example, to display the cycle speed on a cycle computer 80, but it will be appreciated that this data will not be as sensitive as the speed data provided by the gear tooth sensor 65 which will provide many data points per rotation of the rear wheel 26.

For cycles which have sprockets 32 that rotate at the same speed as the wheel they are driving (such as derailleur geared or single speed cycles), another way of detecting the number of teeth on the sprocket 32 being sensed is to use the motor 58, and so the proximity sensor 70 is not essential. When the motor 58 is engaged, the motor data can be used to determine the speed of rotation of the wheel in which the motor is installed. The motor 58 may be in any wheel of the cycle 2. If the motor 58 is in the wheel being driven by the sprockets 32 then the speed of rotation of this wheel is known (it is the same as the speed of rotation of the motor 58). If the motor 58 is not in the wheel being driven by the sprockets 32, the speed of rotation of the wheel driven by sprockets 32 is also known since either the wheels are the same size (and so rotate at the same speed as the motor), or the ratio between the sizes of the wheels are known and this can be used to map the motor data to the speed of rotation of the wheel driven by the sprockets 32 (for example recumbent bicycles may have wheels of different sizes).

Therefore, when the motor 58 is engaged with the wheel and the rider is also providing force via the pedals 28 to drive the cycle 2 forwards, the controller 60 can calculate the number of teeth in the sprocket 32 from the gear motion signal, by counting the number of gear teeth detected for each rotation of the wheel. To be sure that the motor 58 is engaged and the rider is also providing forward motion force with the pedals 28, counting can continue over a number of rotations of the wheel until a consistent number of teeth is obtained which can then be reliably recorded as the number of teeth being sensed.

Once the number of teeth of the sprocket 32 being sensed has been established, the pedal sensor data from the gear tooth sensor 65 can be used on its own to determine the speed of the bicycle during pedalling, and the motor data no longer needs to be used for speed sensing, although this may continue to be used for cross referencing purposes, for example to check that the speed of rotation of the rear sprocket 32 matches cycle speed. The cycle speed data derived from the gear tooth sensor 65 is important in this example because when pedalling the cycle with power and passing through the maximum assisted speed allowed by regulations, the motor 58 must be turned off and at this point no motor data is available to discern the speed of the cycle, and so normally sensing the speed of the cycle would require an auxiliary speed sensor such as a proximity sensor. However, as the gear tooth sensor 65 can provide the speed of the cycle 2 when forward motion pedalling force is being provided, this makes it possible to start the motor 58 again from the gear motion signal, without the need for an extra speed sensor. If the cycle 2 is still being pedalled at above the maximum allowed speed then the controller 60 knows this from the gear tooth signals and does not start the motor. However when this data shows that the cycle 2 speed has dropped below maximum allowable assisted speed the motor can be started again. Hence, the gear tooth sensor 65 provides a single sensor which can be used for detecting pedalling, possible braking (from rapid deceleration and/or reverse rotation of the sprocket 32) and the ground speed of the cycle 2, reducing the number of sensors which need to be fitted and hence making the kit 50 much easier to install.

A user input 76 is also provided to enable the cyclist to control whether electrical assistance is provided by the motor 58 or not. For example, the user input 76 may be mounted on the handle bar 20 of the cycle 2. The user input 76 may be a simple on/off button for switching on and off the power assistance. In other examples the user input 76 may comprise further controls and/or methods for adjusting parameters or changing mode of the cycle kit 50.

The cycle kit 50 may optionally also include other elements which are not required for providing electrical assistance but may conveniently be powered using the battery 52. For example, the kit 50 may include a cycle computer 80 for providing the cyclist with data such as the cycle speed, distance travelled, and so on. Also, front or rear lights 84 may be powered using the battery 52.

Figure 2:
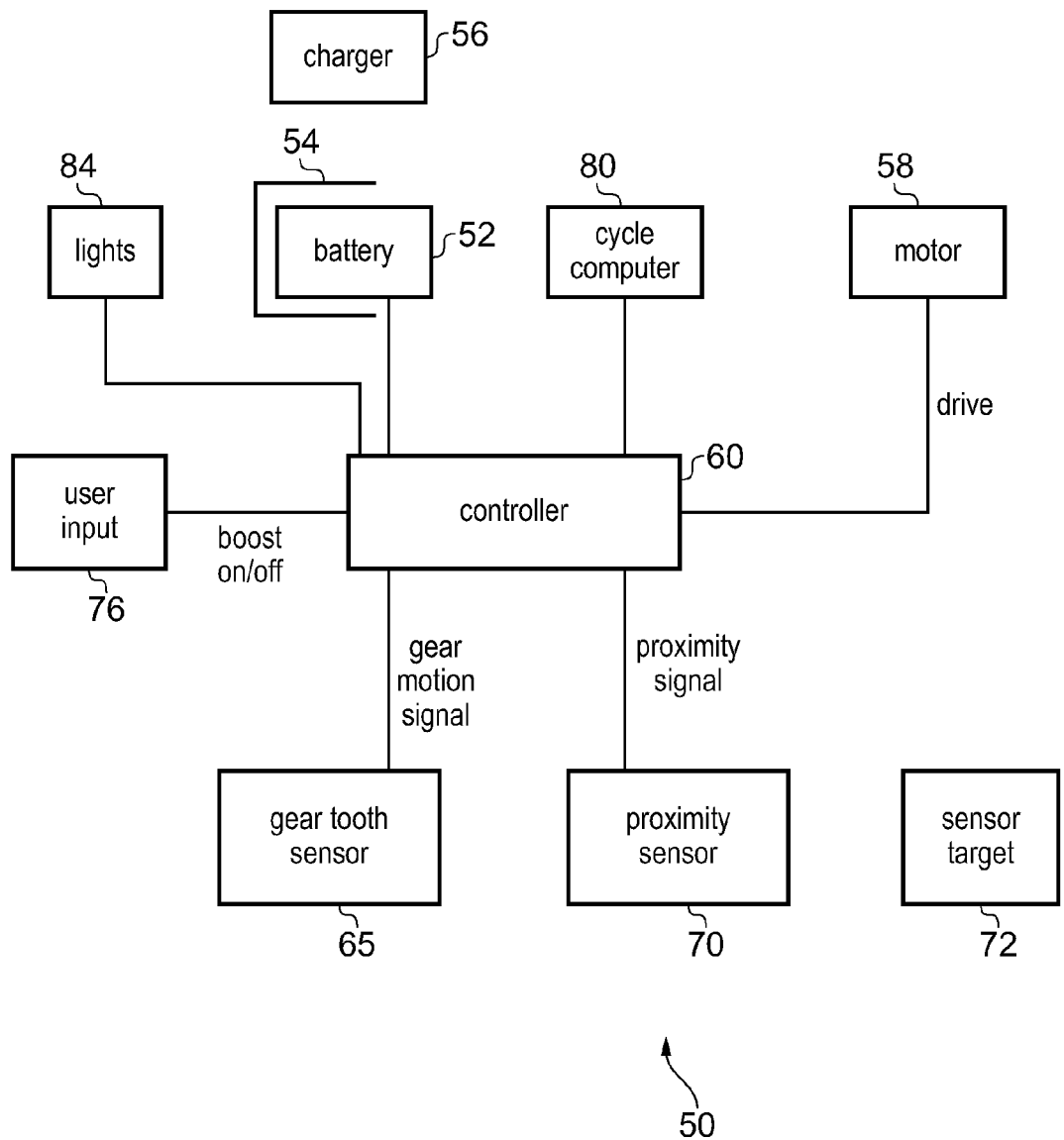
FIG. 2 schematically illustrates the electrically assisted cycle kit.

The cycle kit 50 also includes the various wires and connectors required for making electrical connections between the different elements of the system. The wires may be run along the frame 4 of the cycle 2 when fitting the kit 50 to the cycle 2. Although FIG. 2 shows a system in which, to reduce the amount of wiring, the battery 52 is connected to the controller 60 and the power for the other elements of the kit 50 is distributed from the battery 52 via the controller 60, in other embodiments some elements may be connected directly to the battery 52.

Figure 3:
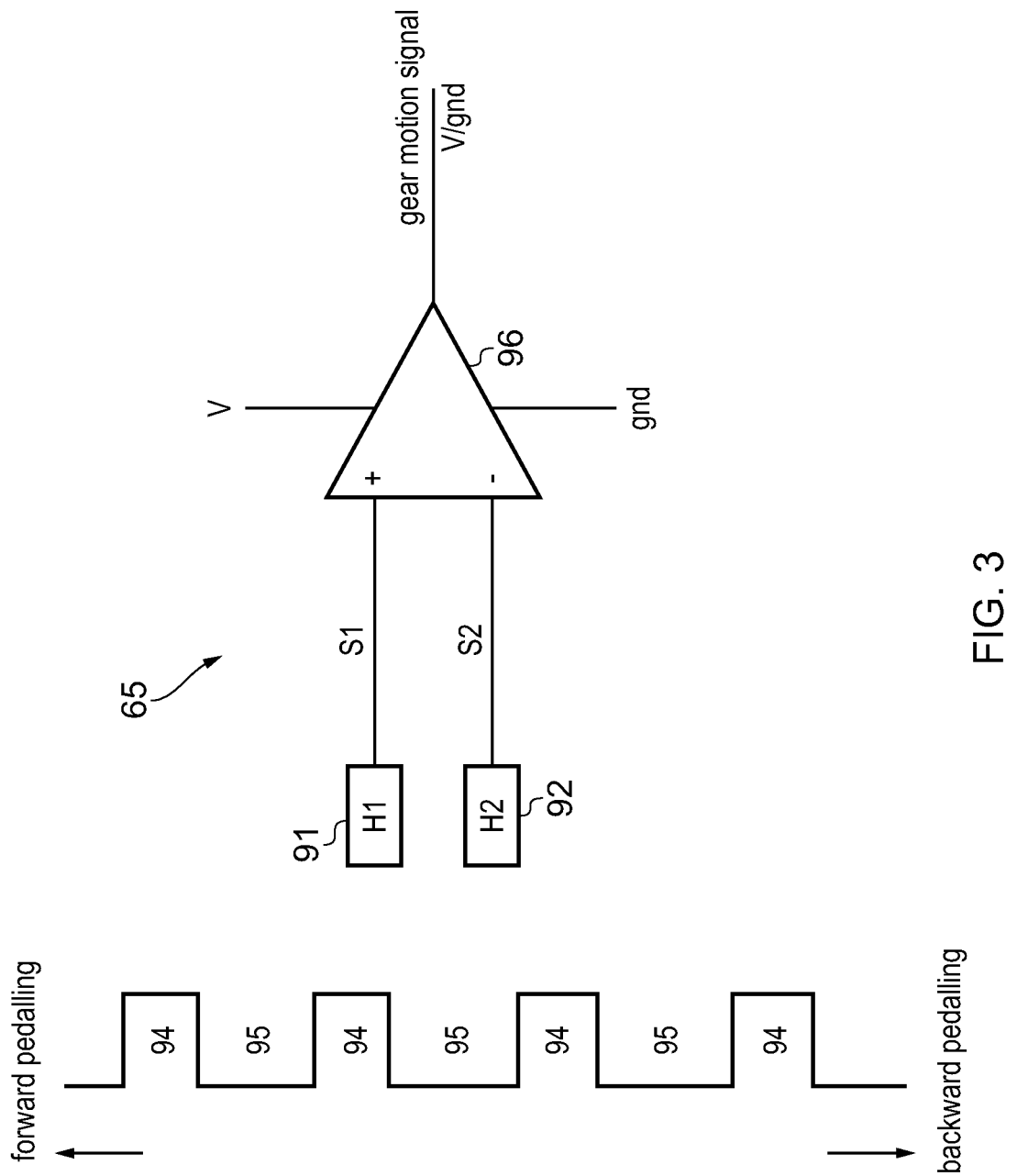
FIG. 3 illustrates an example of the gear tooth sensor.

FIG. 3 shows an example of how the gear tooth sensor 65 can sense the motion of the gear sprocket 32. The gear tooth sensor 65 may be a differential Hall effect sensor comprising two Hall sensors 91, 92 which each generate a sensing signal S1, S2 with a voltage dependent on the magnetic field in the vicinity of the sensors 91, 92. Virtually all pedal cycles 2 have at least some ferrous rear sprockets, because ferrous material tends to be most wear-resistant. Some cycles also have ferrous front chain rings 30. Therefore, the teeth 94 and valleys 95 of the sprocket 32 can be distinguished by the magnetic sensors 91, 92 because the magnetic field in the vicinity of the ferrous teeth 94 is different to the magnetic field in the vicinity of the valleys 95. The magnet itself may be placed, for example, behind the signal sensors S1 and S2 such that the magnetic field is distorted by the presence, or not, of the teeth 94.

The sensing signals S1, S2 are provided to logic 96 which generates an oscillating gear motion signal based on the sensing signals S1, S2. In this example, the logic 96 is arranged to determine the difference S1-S2 between the two sensing signals S1, S2. The logic 96 also converts the difference signal S1-S2 into an oscillating gear motion signal having a square wave profile.

Figure 3A:
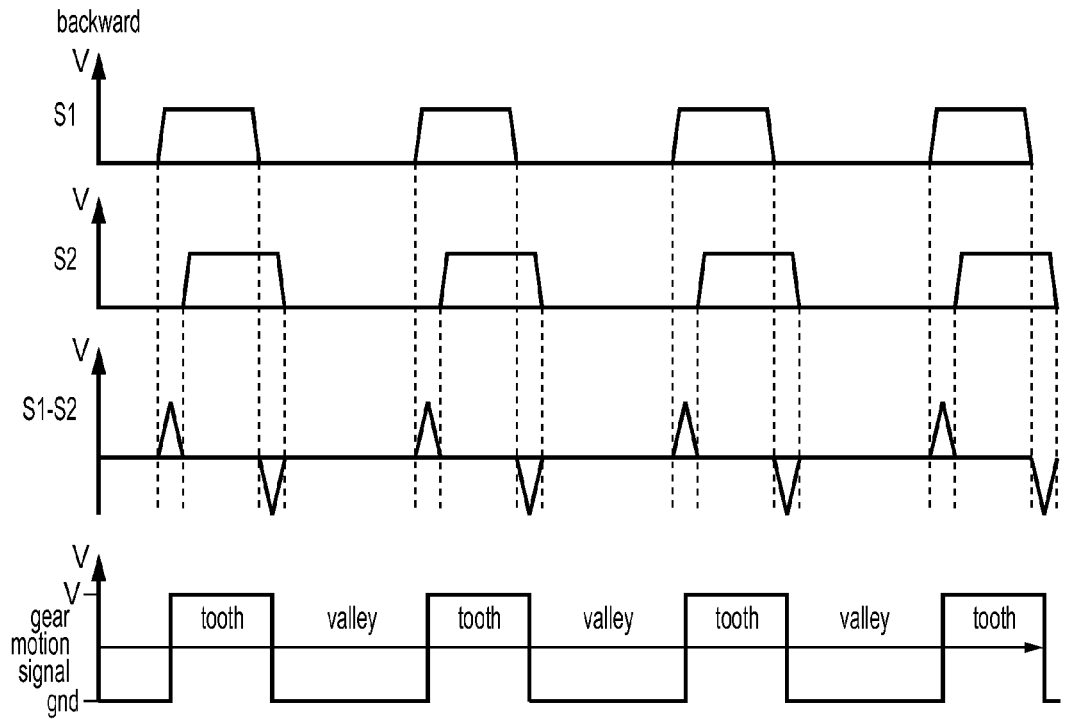
FIGS. 3A and 3B illustrate examples of a gear motion signal provided by the gear tooth sensor and how the direction of rotation of the gear sprocket can be sensed using the sensor.
Figure 3B:
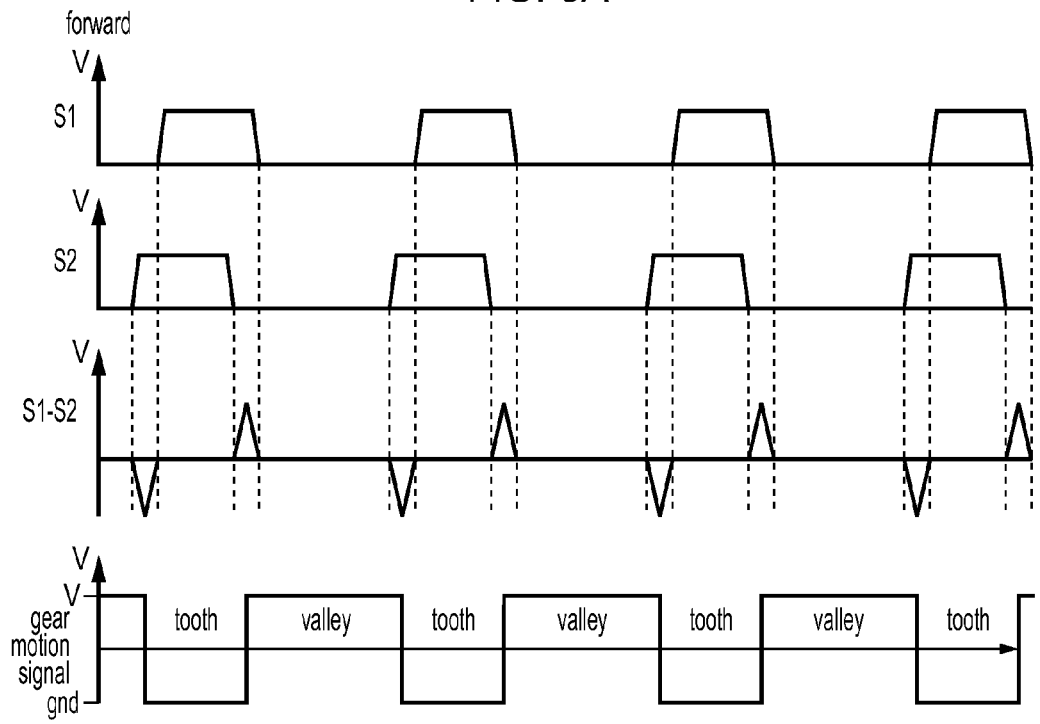

FIGS. 3A and 3B show examples of the sensing signals S1, S2, the difference signal S1-S2 and the gear motion signal for backward and forward pedalling respectively. In this example, the directions corresponding to backward and forward pedalling are as shown in FIG. 3. In this example, the gear motion signal is switched to a high voltage value V in response to a rising edge of the difference signal S1-S2 and the gear motion signal is switched to a low voltage value gnd in response to a falling edge of the difference signal S1-S2 (although other techniques could also be used for generating the gear motion signal).

As shown in FIG. 3A, when pedalling is in the backward direction, the gear teeth move past the sensors 91, 92 so that the first sensor 91 senses the teeth slightly before the second sensor 92. Therefore, each peak of the first sensing signal S1 (corresponding to a tooth being detected) occurs slightly before the corresponding peak of the second sensing signal S2. The difference S1-S2 between the signals S1, S2 therefore has a rising peak when the leading edge of a tooth is sensed by the first sensor 91 while the second sensor 92 still senses a valley, and a falling peak corresponding to the second sensor 92 sensing the trailing edge of the tooth while the first sensor 91 is now sensing the next valley. The difference signal S1-S2 is then converted into the gear motion signal. As the rising edge of the difference signal S1-S2 occurs at the leading edge of each tooth, then high voltage level (V) parts of the gear motion signal correspond to the teeth and the low voltage level (gnd) parts of the gear motion signal correspond to the valleys.

In contrast, when pedalling is in the forward direction as shown in FIG. 3B, the gear teeth move past the sensors in the opposite direction so that each peak of the second sensing signal S2 occurs slightly before the corresponding peak of the first sensing signal S1. Therefore, this time the difference signal S1-S2 has a falling peak when the leading edge of a tooth is sensed by the second sensor 92 and the first sensor 91 is still sensing a valley, and a rising peak when the trailing edge of the tooth is sensed by the first sensor 91 and the second sensor 92 is already sensing the next valley. In FIG. 3B, the falling edges of the difference signal S1-S2 indicate the start of a tooth, and so the resulting gear motion signal has a low voltage level (gnd) in the parts of the gear motion signal corresponding to teeth and a high voltage level (V) in the parts of the gear motion signal corresponding to valleys. That is, for forward pedalling the gear motion signal is inverted compared to the gear motion signal obtained for backward pedalling.

Typically, the gear teeth 94 and valleys 95 of the sprocket 32 will have different widths (for example, often the teeth 94 are narrower than the valleys 95). Therefore, the low and high voltage portions of the gear motion signal corresponding to the teeth and valleys will also have different widths. For example, as shown in FIGS. 3A and 3B, for backward motion the high voltage portions (teeth) are narrower than the low voltage portions (valleys), while for forward motion the high voltage portions (valleys) are wider than the low voltage portions (teeth).

Therefore, by detecting whether the gear motion signal has the high voltage value or the low voltage value for a longer time, the direction of rotation of the gear sprocket can be determined. After each cycle of oscillation, the controller 60 can compare the relative lengths of the period for which the signal had the high value and the period for which the signal had the low value, and determine whether forward or backward pedalling has taken place. This is useful for ensuring that motor drive is applied only when forward pedalling is detected. It will be appreciated that while FIG. 3 shows an example in which backward motion is detected if the high voltage portions last for shorter than the low voltage portions (FIG. 3A), and forward motion detected if the high voltage portions last for longer than the low voltage portions (FIG. 3B), the opposite relationship could also be used. For example, if the logic 96 determines the difference S2-S1 instead of S1-S2 then FIG. 3B would apply for backward rotation and FIG. 3A would apply for forward rotation.

Figure 4:
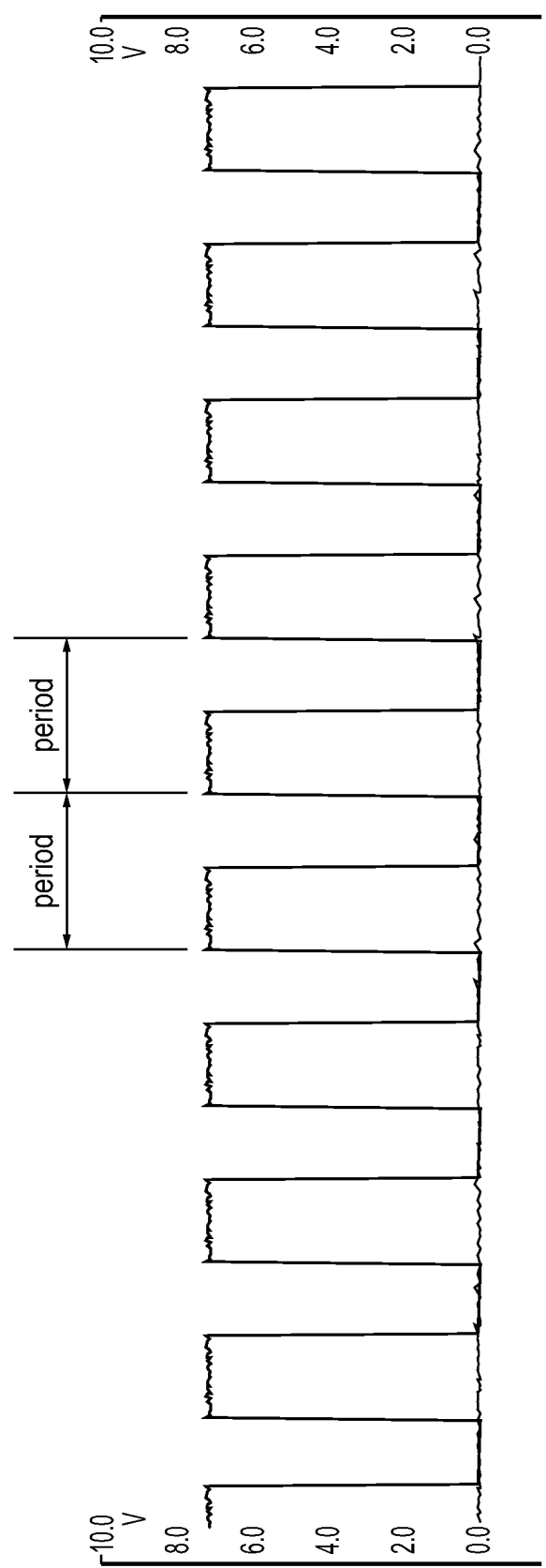
FIG. 4 shows an example of a gear motion signal sensed by the gear tooth sensor.

FIG. 4 shows an example of a gear motion signal measured in practice during testing of a pedal cycle 2 fitted with the kit 50. As shown in FIG. 4, the signal has a regular oscillating form. The period or frequency of oscillation can be measured after each cycle to determine the speed of pedalling at each cycle of the oscillation. Also, the controller 60 may monitor changes in the pedalling speed to determine the acceleration of pedalling.

It will be appreciated that there are a wide range of ways in which the sensing signals S1, S2 could be processed to determine the speed, acceleration and direction of motion of the gear teeth and valleys. Separate channels may be used to indicate direction and speed, for example.

The controller 60 may control the drive of the motor 58 in a variety of ways based on the direction, speed and acceleration of motion detected by the gear tooth sensor 65. When starting from rest, the controller 60 may require a given drive start condition to occur before starting to drive the motor. For example, the controller 60 may simply start driving the motor 58 when forward rotation of the gear sprocket is detected. On the other hand, to prevent motor drive being applied when very small speeds are detected, then a certain threshold speed may be required before drive is applied. This can be useful to prevent drive being applied in cases where the cyclist is simply moving the pedals forwards manually while stationary or where a slight bump causes the pedals to move. Motor drive may also be applied when acceleration of the gear teeth and valleys is detected by the gear tooth sensor 65.

It is possible that bumps to the cycle or non-uniform pedalling by the cyclist may cause a few cycles of the oscillating signal to be detected as indicating reverse motion of the pedals even when motion is generally in the forward direction, or vice versa. To prevent motor boost being applied in response to such an erroneous reading, the controller 60 can measure a number of instances of the direction of rotation in a given space of time, and may apply forward drive if at least a given proportion (e.g. at least 6 out of the last 8 detections) indicate that there is rotation of the gear sprocket in the forward direction. Similarly, when sensing the speed or acceleration of the sprocket, the decision of whether to apply motor drive may also be based on detecting whether at least a given proportion of readings over a period of time meet the start threshold requirement.

Figure 5:
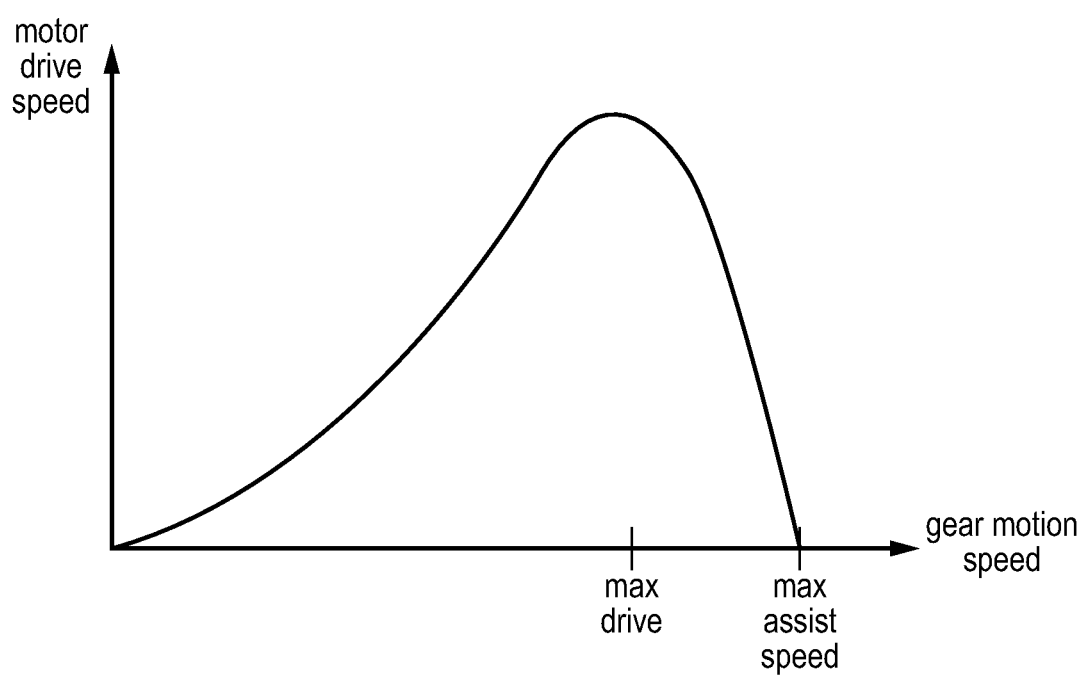
FIG. 5 shows an example of the way in which the drive speed of the electric motor may be controlled as a function of the gear motion speed detected by the gear tooth sensor.

Once the motor drive has been applied, then the drive speed of the motor 58 may be controlled based on the motion speed of the gear teeth and valleys as determined from the gear motion signal. FIG. 5 shows an example of how the motor drive speed can be controlled as a function of the gear motion speed sensed by the sensor 65 (in other examples, the gear motion speed may be expressed in terms of the oscillation period or oscillation frequency of the signal shown in FIG. 4). The function may have a non-linear form which rises slowly at low pedalling speeds and rises more rapidly (for example exponentially) until a threshold speed corresponding to maximum motor drive is reached. Beyond a maximum motor drive speed, the motor drive speed may be gradually reduced to prevent motor drive being applied when the cycle 2 is travelling at greater than a maximum allowed speed. This is to comply with international safety regulations which may require that the electrical assistance is stopped when the cycle 2 is travelling at greater than a maximum assist speed.

Similarly, the controller 60 may control when to stop the motor drive based on the sensing data provided from the gear tooth sensor 65. If reverse pedalling is detected, then the motor drive may be cut. Many European bikes have reverse pedal brakes and so detecting reverse pedalling may generally indicate that the cyclist wishes to stop. Similarly, if deceleration of the rotation of the gear sprocket is detected by the gear tooth sensor 65 then the motor drive can be reduced. The drive of the motor may also be reduced if the motion speed of the gear teeth and valleys drops to a given threshold speed. Again, the controller 60 may monitor several instances of gear motion readings over a period of time and reduce the motor drive if at least a given proportion of the readings indicate deceleration, a drop in speed or reverse rotation of the sprocket, in order to filter out the odd false reading.

In another example, once the motor drive has been applied the controller 60 may drive the motor 58 using current control by maintaining a current limit. Different current limits may then be selected to provide the desired level of assistance. The controller 60 then uses the data provided by the gear tooth sensor 65 for starting the motor, stopping the motor and reducing the current as data provided by the gear tooth sensor 65 indicates that the cycle speed is approaching the maximum speed allowed or when rapid deceleration of pedalling is indicated.

Figure 6:
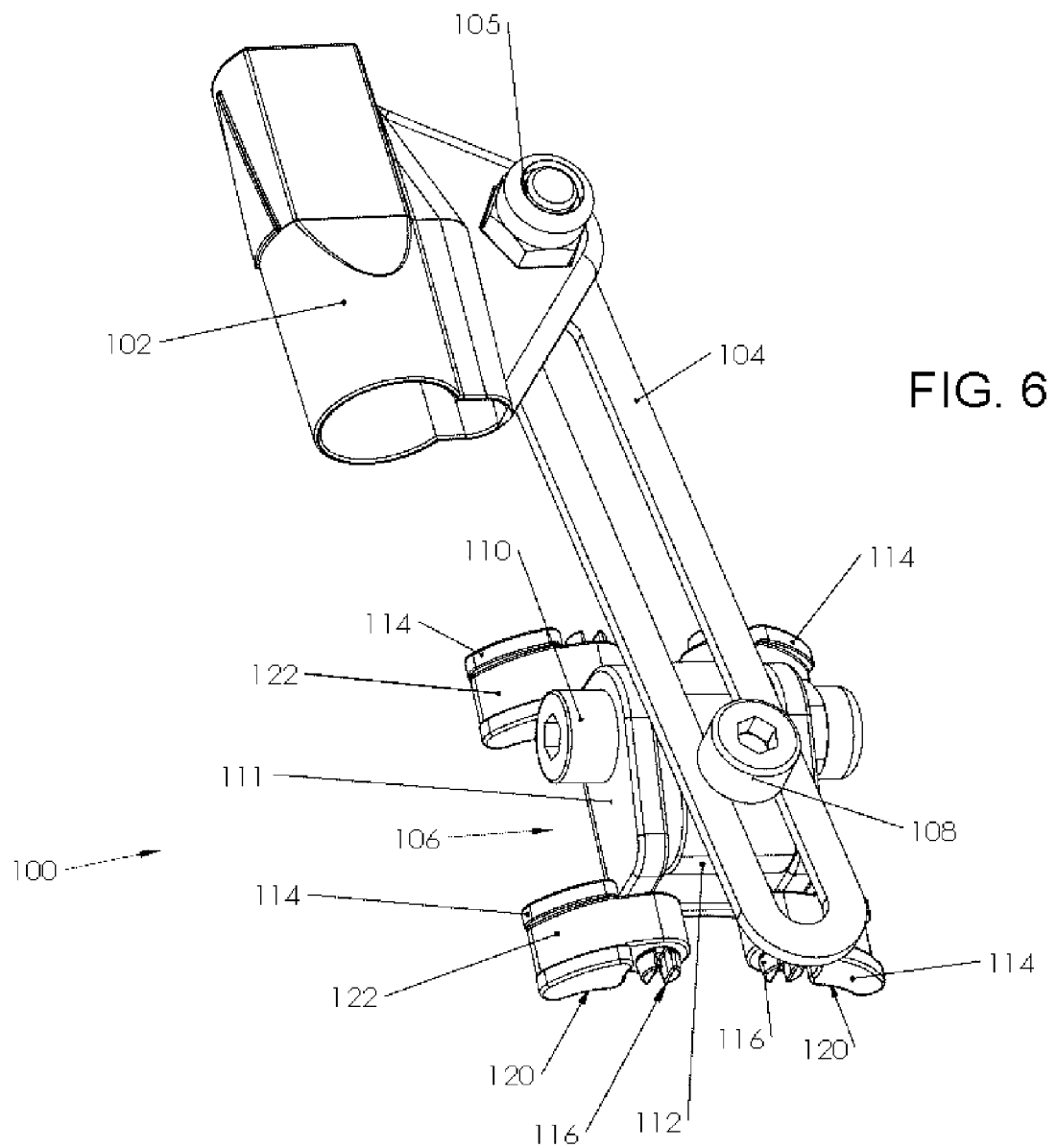
FIG. 6 shows a first example of a sensor attachment for attaching a gear tooth sensor to a frame of a cycle.

FIG. 6 shows an example of a sensor attachment 100 for attaching the gear tooth sensor 65 to the cycle 2. The sensor attachment 100 is adjustable to permit attachment of the sensor to a wide variety of cycles 2 with different configurations and different frame shapes and sizes. The attachment 100 comprises a sensor housing 102 for housing the gear tooth sensor 65. The gear tooth sensor 65 may be mounted for example on a printed circuit board which is disposed within the sensor housing 102. The sensor housing 102 may include connectors for connecting wires to the sensor 65 for conveying signals to the controller 60.

The sensor housing 102 is attached to a support arm 104 using a connecting bolt 105. The sensor housing 102 is free to rotate about the connecting bolt 105 to enable the sensor housing 102 to be pointed at different angles relative to the support arm 104. The other end of the support arm 104 is connected to a support platform 106 for attaching to the frame 4 of the cycle 2. Another connecting bolt 108 connects the support arm 104 to the platform 106 and permits rotation of the support arm 104 relative to the platform 106. The support arm 104 is also slotted so that the support arm 104 and support platform 106 can be slid relative to each other to allow the sensor housing 102 to be placed at different distances away from the platform 106.

The platform 106 comprises a base portion 111 and a pivoting portion 112 connected by a third connecting bolt 110. The base portion 111 is for attaching to the frame of the cycle 2, while the pivoting portion 112 supports the support arm 104 and can pivot about the connecting bolt 110 so that the support arm 104 and sensor housing 102 can swing round about the axis of the third connecting bolt 110 to allow variation of the angle between the support arm 104 and the part of the frame to which the attachment 100 is attached.

Hence, the attachment permits four degrees of freedom:
rotation of the sensor housing 102 relative to the support arm 104 about the bolt 105;
sliding of the platform 106 and support arm 104 relative to each other by sliding bolt 108 up and down the slot of the support arm 104;
rotation of the support arm 104 relative to the platform 106 about bolt 108; and
pivoting of the pivoting portion 112 of the platform 106 relative to the base portion 111 of the platform 106 about bolt 110.

Therefore, the attachment allows the sensor housing 102 to be moved with a large degree of flexibility to accommodate different positions of the gear sprockets 32 relative to the frame to which the sensor attachment 100 is to be attached. This enables the gear tooth sensor 65 to be connected to virtually any design of cycle 2. If desired, instead of or in addition to the platform 106 being slidable relative to the support arm 104, the sensor housing 102 could be made slidable relative to the end of the support arm 104.

Figure 7:
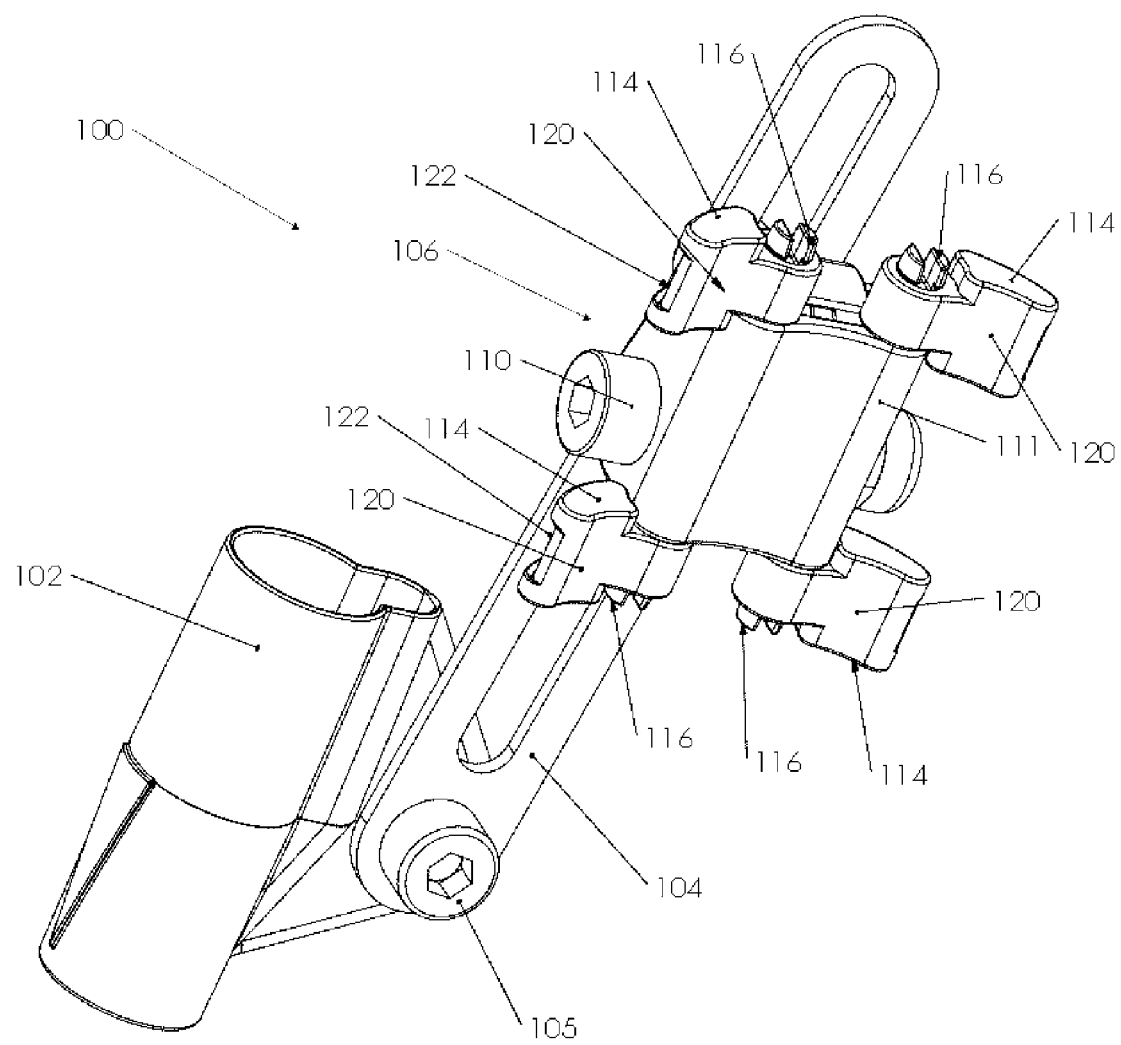
FIG. 7 shows a second view of the sensor attachment.

FIG. 7 shows the same attachment 100 as in FIG. 6, but viewed from the opposite side. As shown in FIGS. 6 and 7, the support platform 106 comprises a number of pivoting gripping members 114 which are connected to axles 116 extending from the base portion 111 of the platform 106. FIGS. 6 and 7 show an example with four gripping members, but other numbers of gripping members may also be provided. The gripping members 114 can be pivoted so as to grip a wide range of different shapes of frame. A gripping surface 120 of the gripping members 114 is formed to be curved in a slightly concave form. This increases the numbers of points at which the surface can grip. The gripping surface 120 is also formed of a slip-resistant material such as a plastic or rubber. This increases the purchase which the gripping members 120 can achieve relative to the frame 4 and prevents slipping of the attachment 100 relative to the frame.

The gripping members also include a groove 122 on the non-gripping side of the members for accommodating flexible securing straps such as cable ties or wires. In other embodiments, the support platform 106 may also be grooved to accommodate the straps. The securing strap can be bound around the gripping members to firmly secure the sensor attachment 100 to the frame, and form the gripping members and platform into one rigid unit conformed to the shape of the frame. Where the frame section around the strap is not circular then the resulting clamp can mechanically prevent twisting of the attachment around the frame due to the overall solid unit having conformed to the shape of the frame. The wider platform provided by the gripping members and platform when secured by the strap prevents rocking and the additional contact points provided by the gripping members prevents slipping.

Figure 8:
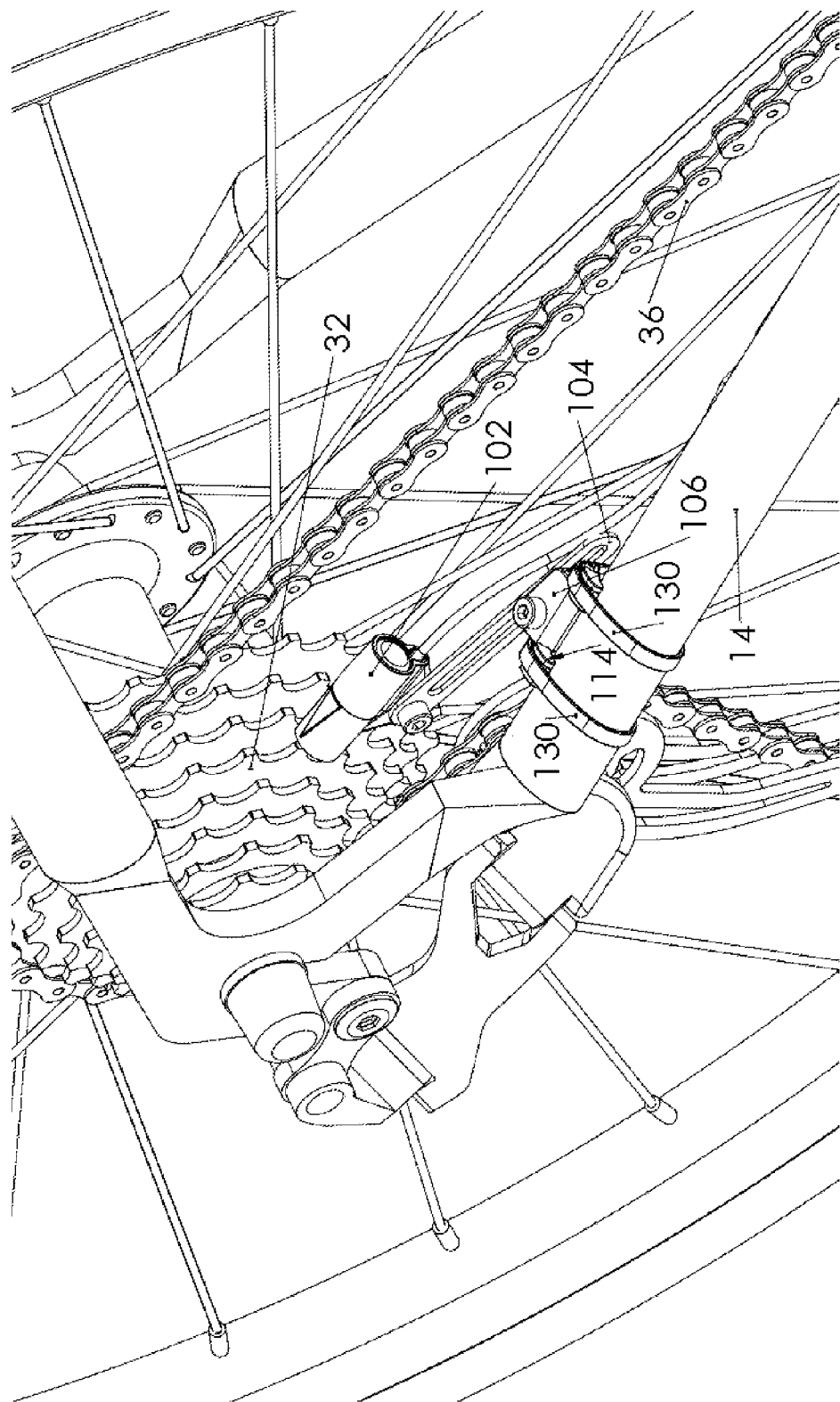
FIG. 8 illustrates the gear tooth sensor and sensor attachment attached to a chain stay of the cycle when viewed from the drive side of the cycle.
Figure 9:
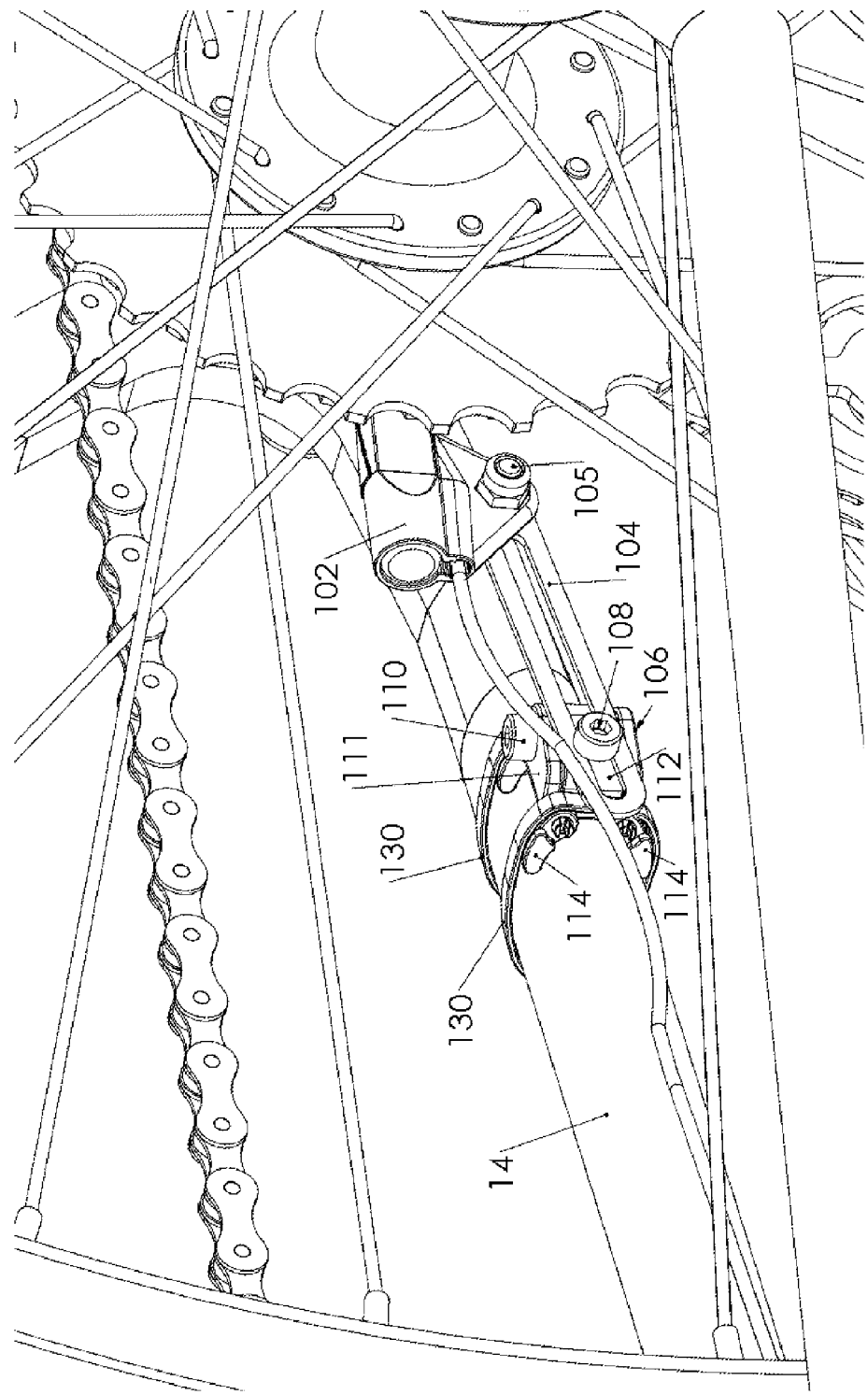
FIG. 9 shows the gear tooth sensor and sensor attachment attached to the chain stay when viewed from the other side of the cycle.

FIGS. 8 and 9 illustrate an example of the sensor attachment 100 being used to attach the gear tooth sensor 65 to the chain stay 14 of the cycle frame 4 on the drive side of the cycle 2. The support platform 106 is attached to the side of the chain stay 14 with the gripping members 114 gripping the chain stay 14. Flexible securing straps (cable ties) 130 are wrapped around the gripping members 114, passing through the grooves 122 in the gripping members 114. The securing straps 130 are fastened to securely press the gripping members 114 against the chain stay 14 to prevent slippage and rocking and provide additional mechanical support against twisting around the chain stay 14 where the chain stay 14 is not circular in cross section. The support arm 104 is rotated and manoeuvred relative to the support platform 106, and the pivoting portion 112 of the support platform pivoted relative to the base portion 111, to position the sensor housing 102 in the vicinity of the rear sprocket 32. The nuts on the connecting bolts 105, 108, 110 are fastened to secure the sensor housing 102 in the desired position.

In this example, the sensor is positioned to sense the fourth largest rear sprocket 32 (the arrow on the top of the sensor housing 102 indicates the sprocket being sensed). In other examples, the sensor can be mounted in a similar way to sense one of the front chain rings 30. Also, while FIGS. 8 and 9 show the sensor attachment being arranged with the support platform 106 on the side of the chain stay 14, the support platform 106 may also be attached to the top of the chain stay 14 if required to position the sensor housing 102 near the sprocket 32 and a longer bolt used in place of bolt 110 such that it extends inwards, the support arm 104 then being secured at the desired depth and angle between two further nuts.

Figure 10:
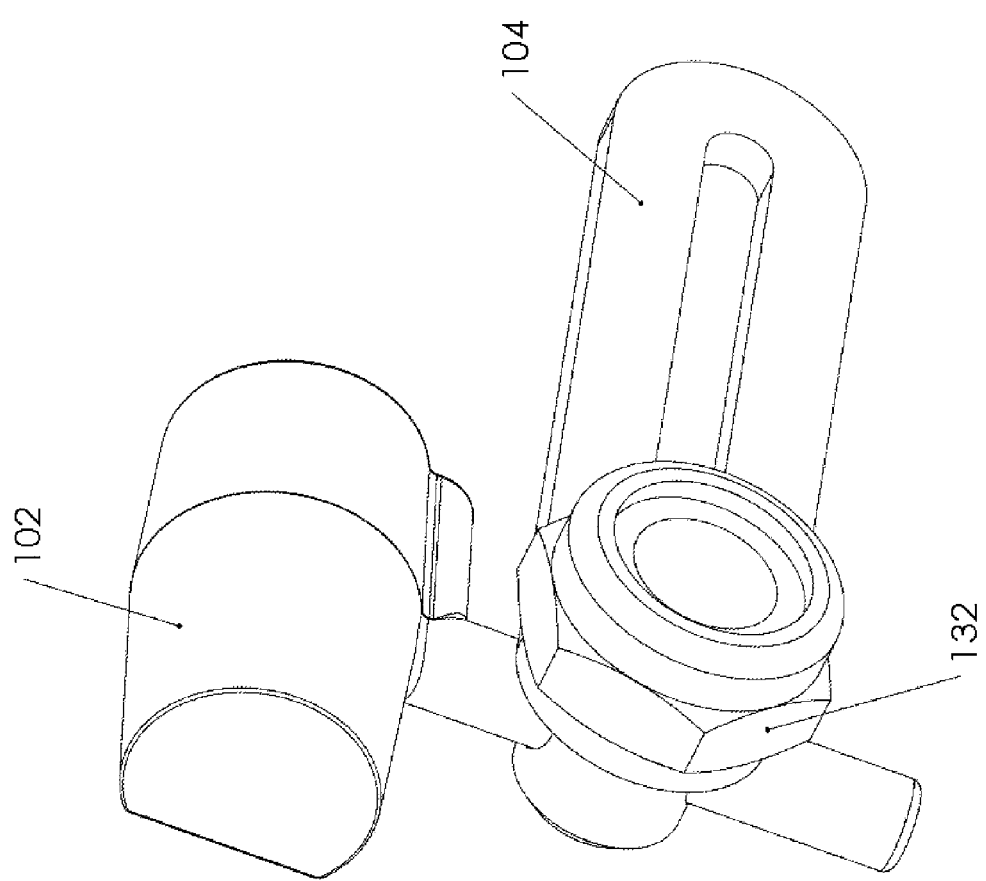
FIG. 10 shows an alternative way of connecting the sensor housing to a support arm of the sensor attachment.

FIG. 10 illustrates an alternative way of attaching the sensor housing 102 to the support arm 104. The sensor housing 102 and support arm 104 may be connected using a nut 132 instead of the socket head bolt 105 shown in FIGS. 6 and 7. This provides two additional adjustments, one vertical between the sensor housing 102 and support arm 104 and one rotational between the sensor housing 102 and support arm 104.

The attachment 100 shown in FIGS. 6 to 10 may also be used to attach objects other than a gear tooth sensor to the frame 4 of a cycle 2. For example, a water bottle or air pump could be attached to a cycle frame in a similar way using an attachment having pivoting gripping members 114 which grip the frame and are securely fastened using securing straps 130 which pass through grooves in the non-gripping surface of the gripping members 114.

Figure 11:
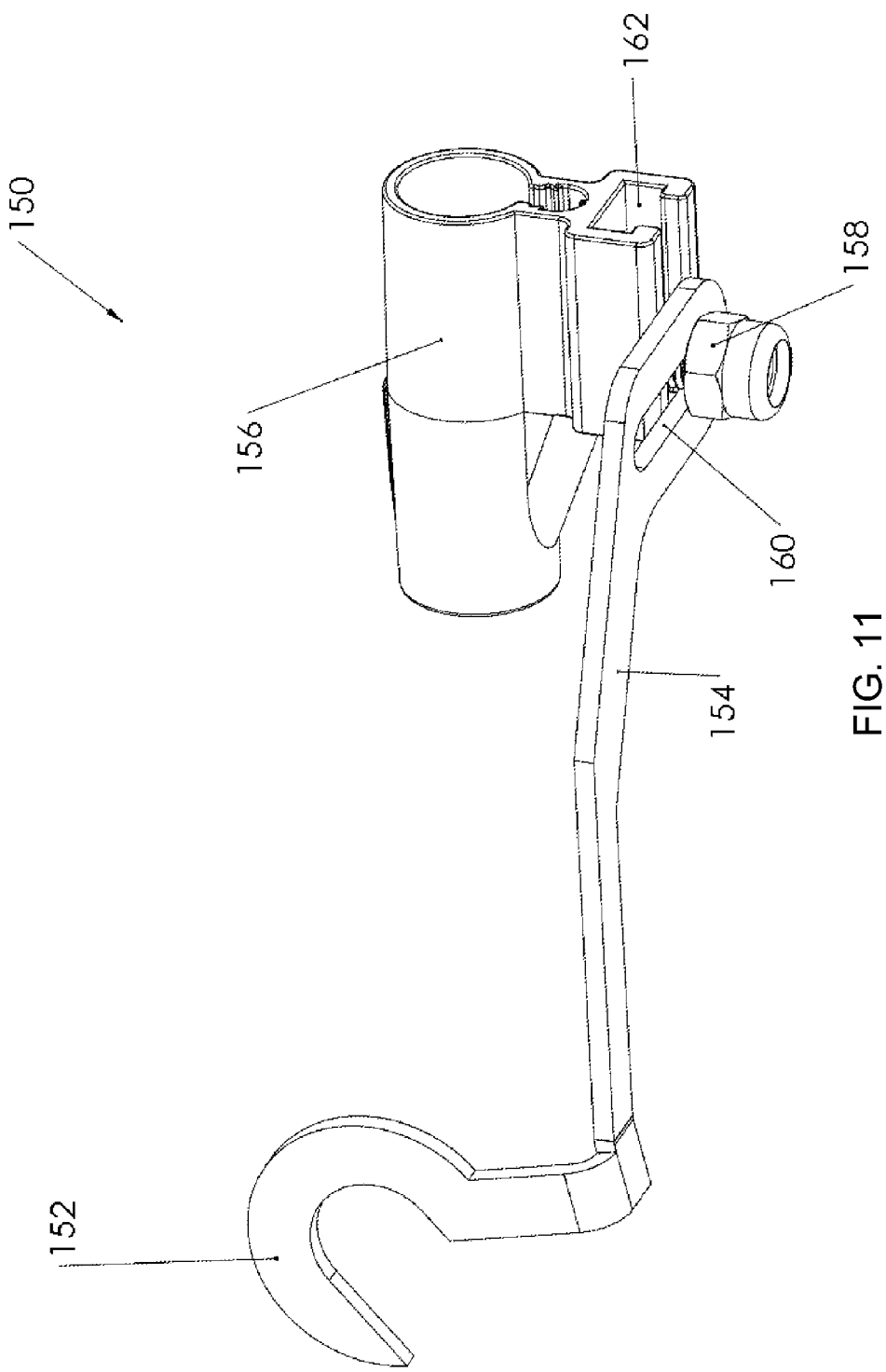
FIG. 11 shows a rear axle attachment for a gear tooth sensor.

FIG. 11 shows a second example of a sensor attachment 150 for attaching the gear tooth sensor 65 to a rear axle of the pedal cycle. The sensor attachment 150 comprises a hook 152 for attaching round the rear axle of the cycle 2. In other examples the hook 152 may be replaced with a ring. The hook is connected to a support arm 154. The sensor housing 156 housing the gear tooth sensor 65 is mounted on the other end of the support arm 154 and is rotatable relative to the support arm 154 about a bolt 158. The sensor housing 156 may also be slid laterally along a slot 160 in the support arm 154 and also along a slot 162 in the sensor casing 156.

Figure 12:
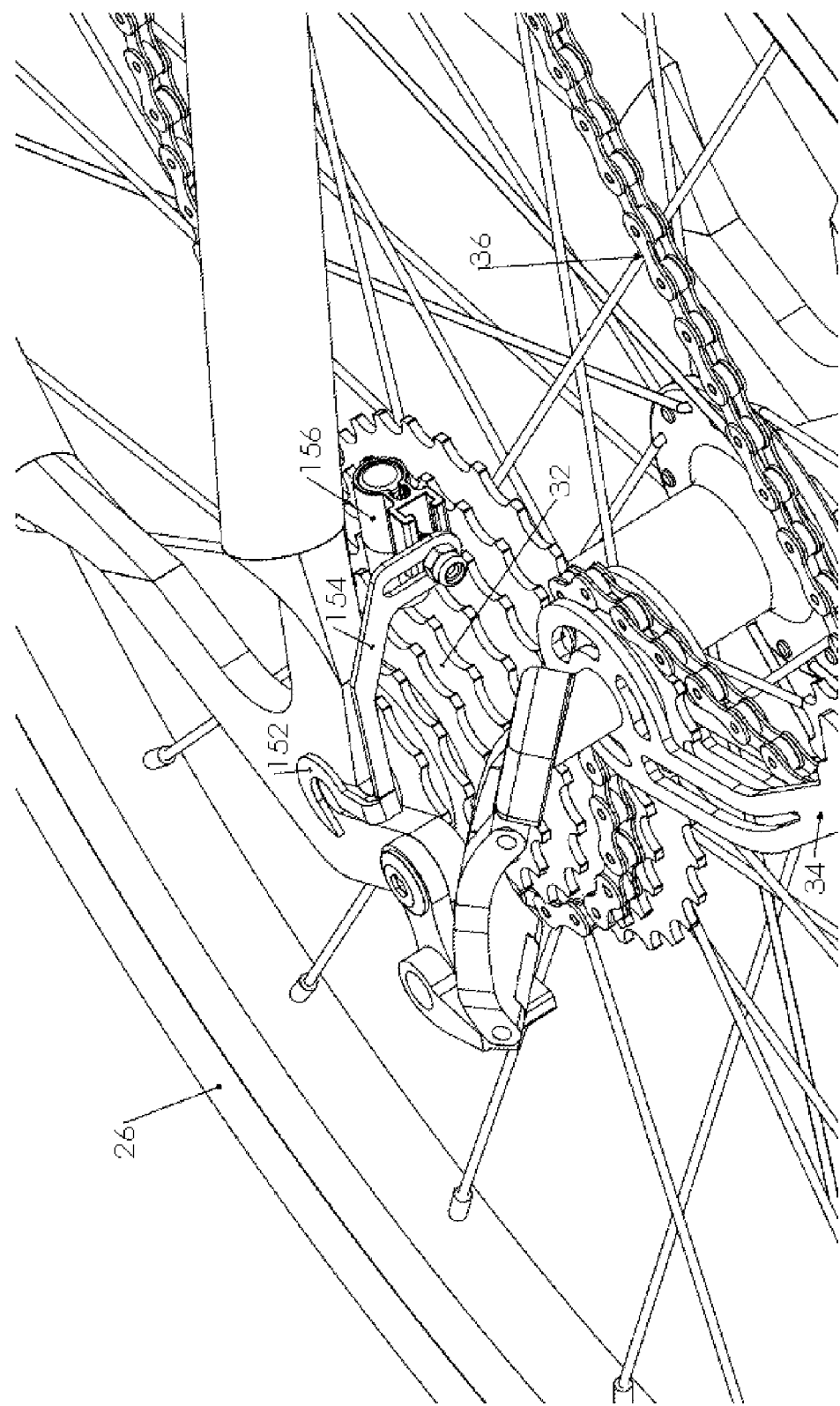
FIG. 12 shows an example of how the sensor may be attached to the rear axle of the cycle.

FIG. 12 shows an example of attaching the sensor attachment 150 to a cycle 2. FIG. 12 shows the rear wheel 26 of the cycle 2 when viewed from below. The hook 152 of the cycle attachment is hooked about the rear axle (the rear axle has been omitted from FIG. 12 to enable a better view of the hook 152). The hook 152 is held in place by an axle nut which fastens on the end of the rear axle or a quick release skewer/clamp which provides a clamping force through the axle applied to either side of the fork dropouts. The support arm 154 extends towards the rear sprockets to allow the sensor housing 156 to be positioned near the rear sprocket 32.

Figure 13:
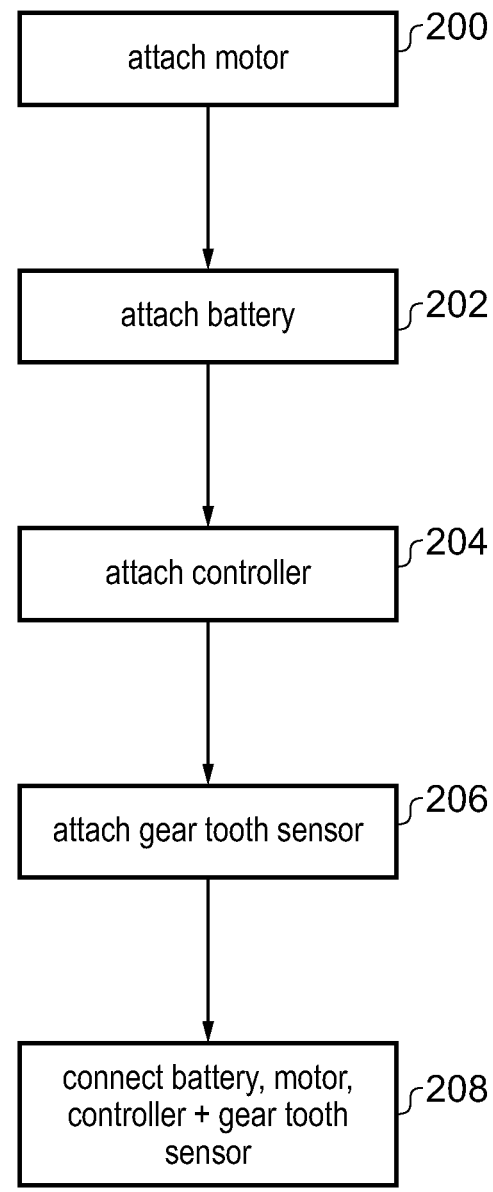
FIG. 13 illustrates a method of fitting an electrically assisted cycle kit to the pedal cycle.

FIG. 13 shows an example of a method of fitting an electrically assisted cycle kit to a pedal cycle. At step 200, the motor 58 is attached to the front wheel 24 of the cycle 2. At step 202 the battery cage 54 is installed on the frame 4 of the cycle and the battery 52 is stored within the cage 54. At step 204, the controller 60 is attached to the cycle 2 (whether as an independent unit or as part of another element such as the battery 52, cage 54 or motor 58). At step 206, the gear tooth sensor 65 is attached to the cycle in the vicinity of one of the front or rear sprockets 30, 32. For example, one of the attachments described above may be used. At step 208, the battery 52, motor 58, controller 60 and gear tooth sensor 65 are connected together. The controller 60 may also be calibrated using information indicating the number of teeth on the gear sprocket 32 or the size of the wheel 26 for example. Alternatively, the proximity sensor 70 and magnetic target 72 may be fitted to enable the number of teeth of the gear sprocket to be sensed and continuous speed data for the cycle to be provided. Optionally, the cycle computer 80 and light 84 may also be provided and connected to the battery 52 or controller 60. While FIG. 13 shows a sequence of operations, it will be appreciated that the elements of the cycle kit may be fitted in any order and so the order of the steps of the method may be switched.

Figure 14:
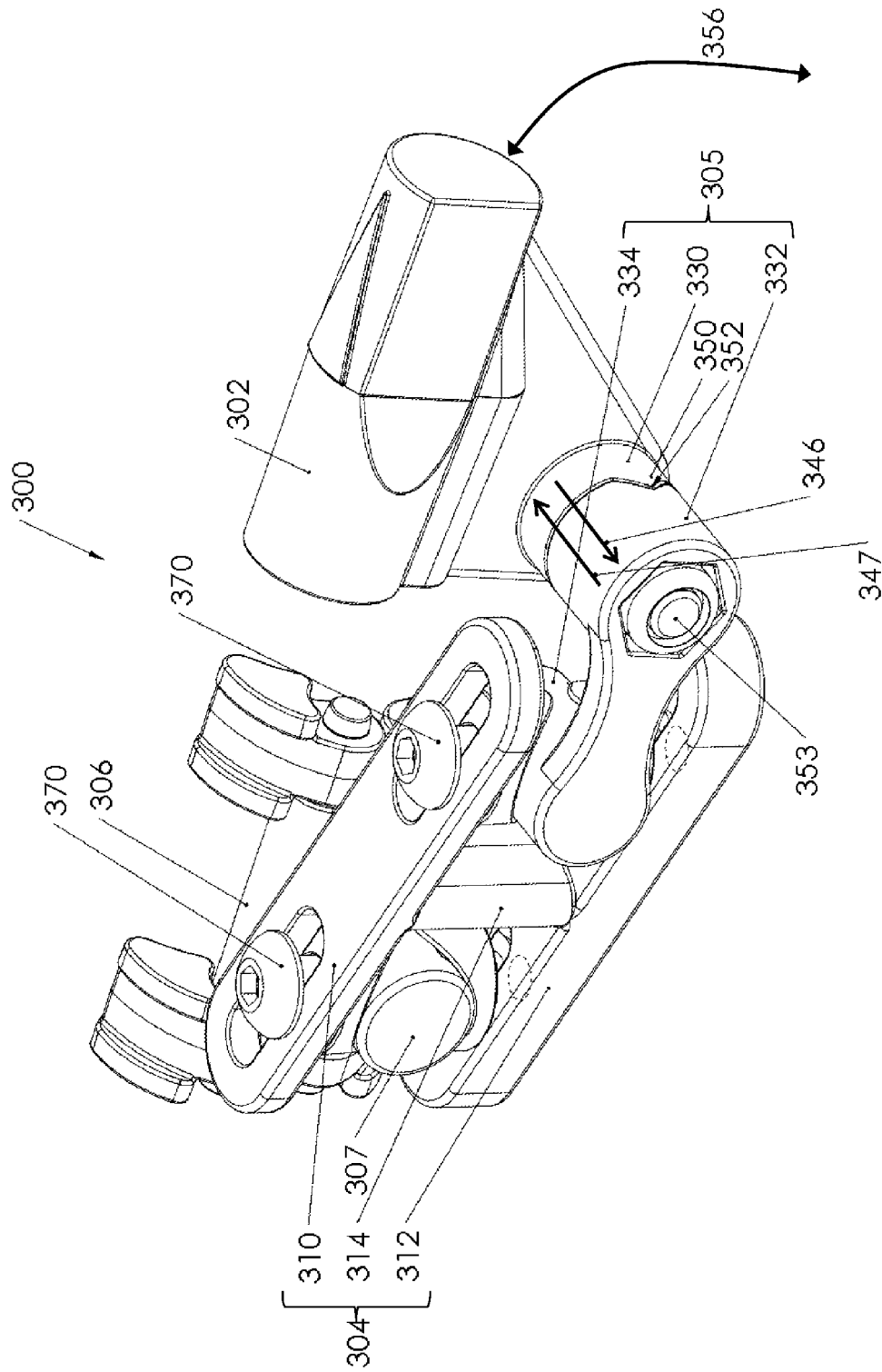
FIGS. 14 to 16 illustrate another example of a sensor attachment for attaching the gear tooth sensor to the frame of a cycle.
Figure 15:
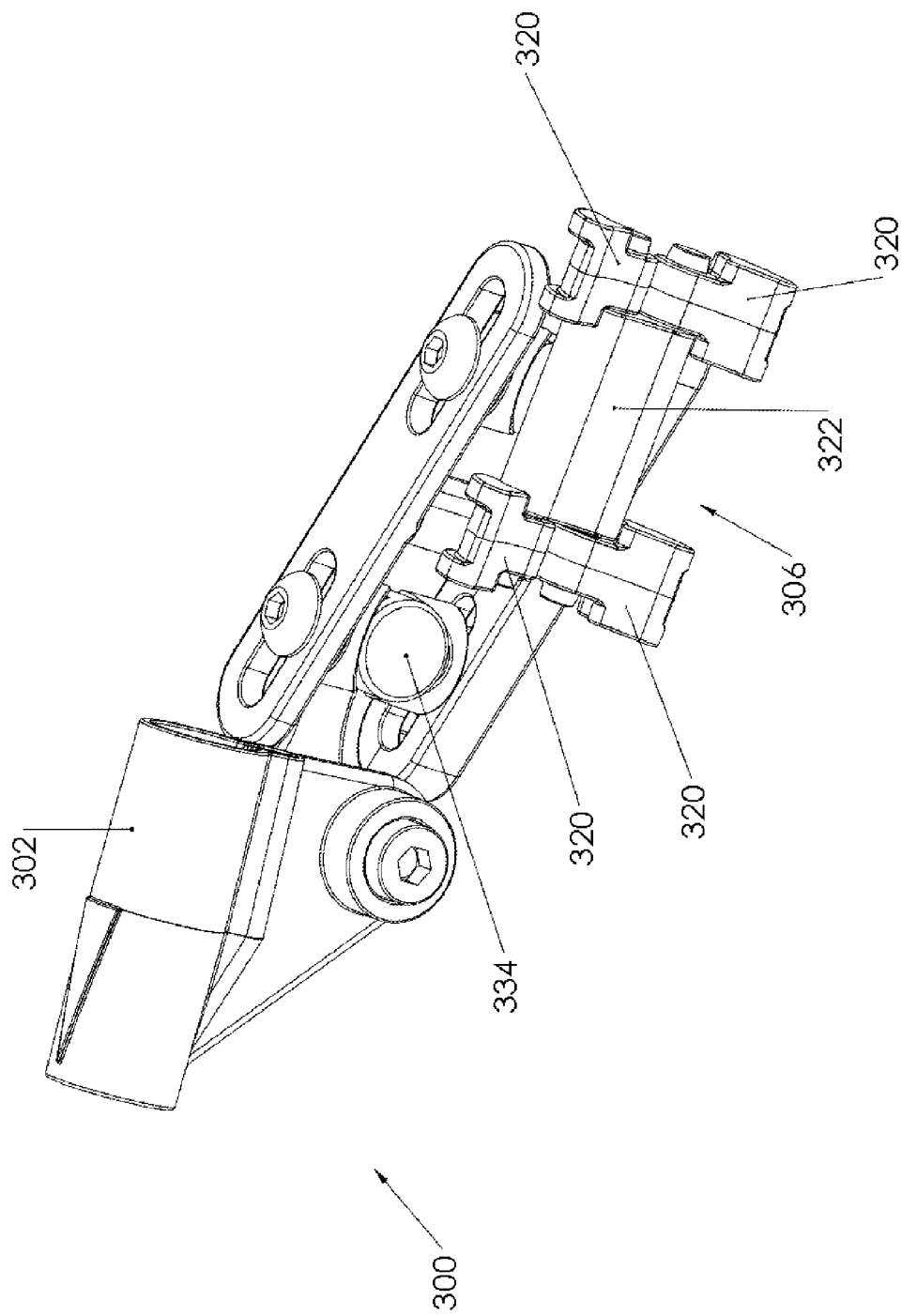
Figure 16:
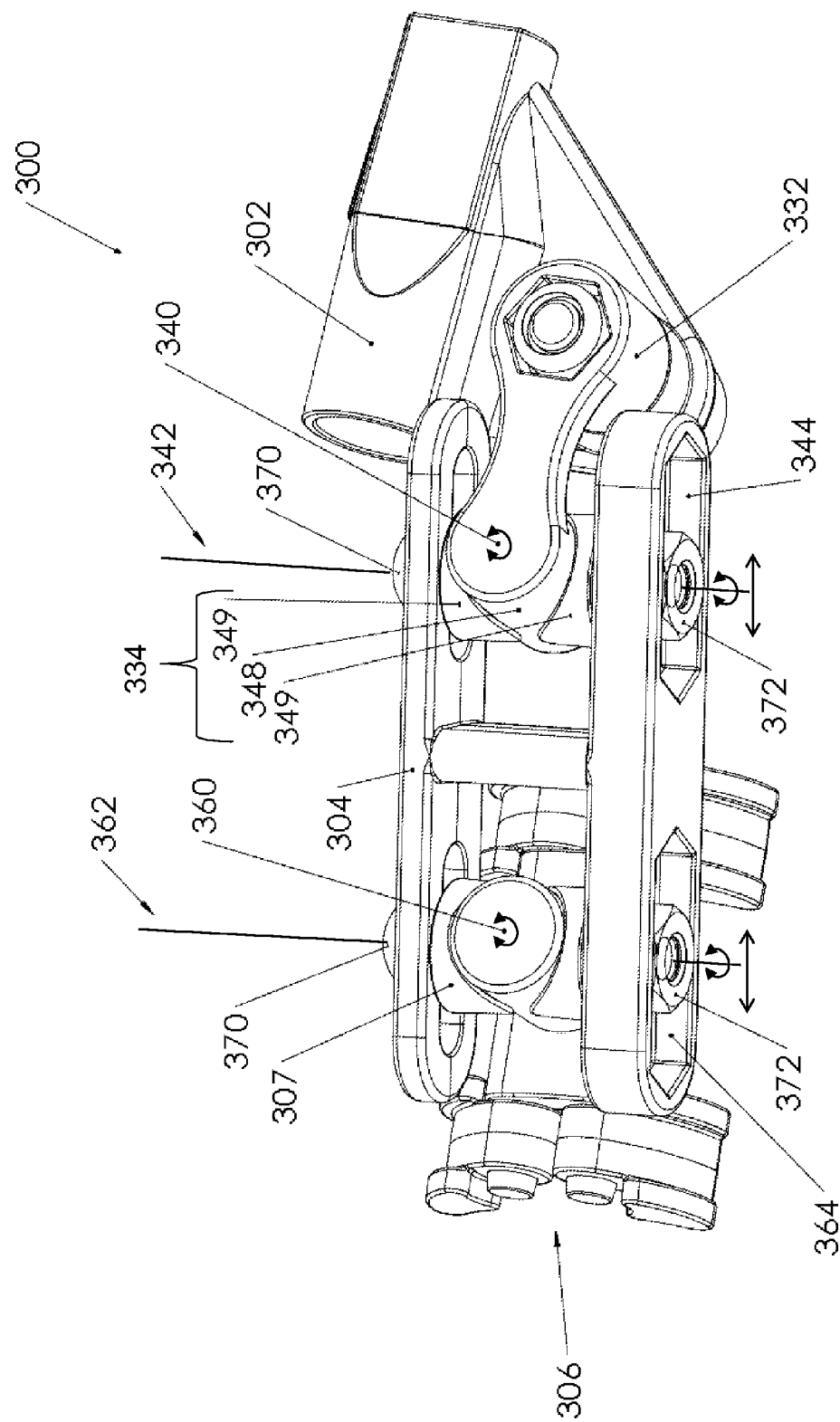

FIGS. 14 to 20 illustrate another example of a sensor attachment 300 for attaching the gear tooth sensor 65 to the pedal cycle 2. For example, the attachment 300 may attach to the chain stay 14. FIGS. 14, 15 and 16 respectively illustrate the attachment 300 when viewed from the right hand side, from the left hand side, and from below. The sensor attachment 300 comprises a sensor housing 302 for housing the gear tooth sensor 65, which is similar to the sensor housing 102 shown in FIGS. 6 and 7. The sensor housing 302 is attached to a support arm 304 via a first joining portion 305. The other end of the support arm 304 is connected to a support platform 306 via a second joining portion 307. The support platform 306 attaches to the frame 4 to secure the attachment 300 to the pedal cycle 2.

As shown in FIG. 14, the support arm 304 comprises two parallel support bars 310, 312 connected by a cross bar 314. This makes the support arm 304 more robust and less prone to bending than the support arm 104 of FIG. 6, allowing the gear tooth sensor 65 to be held in place more securely.

As shown in FIG. 15, the support platform 306 again comprises multiple gripping members 320. In this example, the gripping members 320 are made entirely out of a flexible slip-resistant material such as rubber. As the gripping members are flexible, they can bend to conform to the shape of the chain stay 14 of the cycle 2, and so, although the gripping members can be arranged to pivot about axles extending from the base portion of the support platform as in FIG. 7, this is not essential and non-pivoting gripping members 320 may be provided and the axles 116 of FIG. 7 could be omitted if desired. By reducing the number of components of the support platform 306 and making the gripping members 320 out of a single material (e.g. rubber), the manufacture of the support platform 306 is simplified. Also, the friction provided by the gripping members 320 prevents slippage of the attachment 300 relative to the cycle 2.

Figure 20:
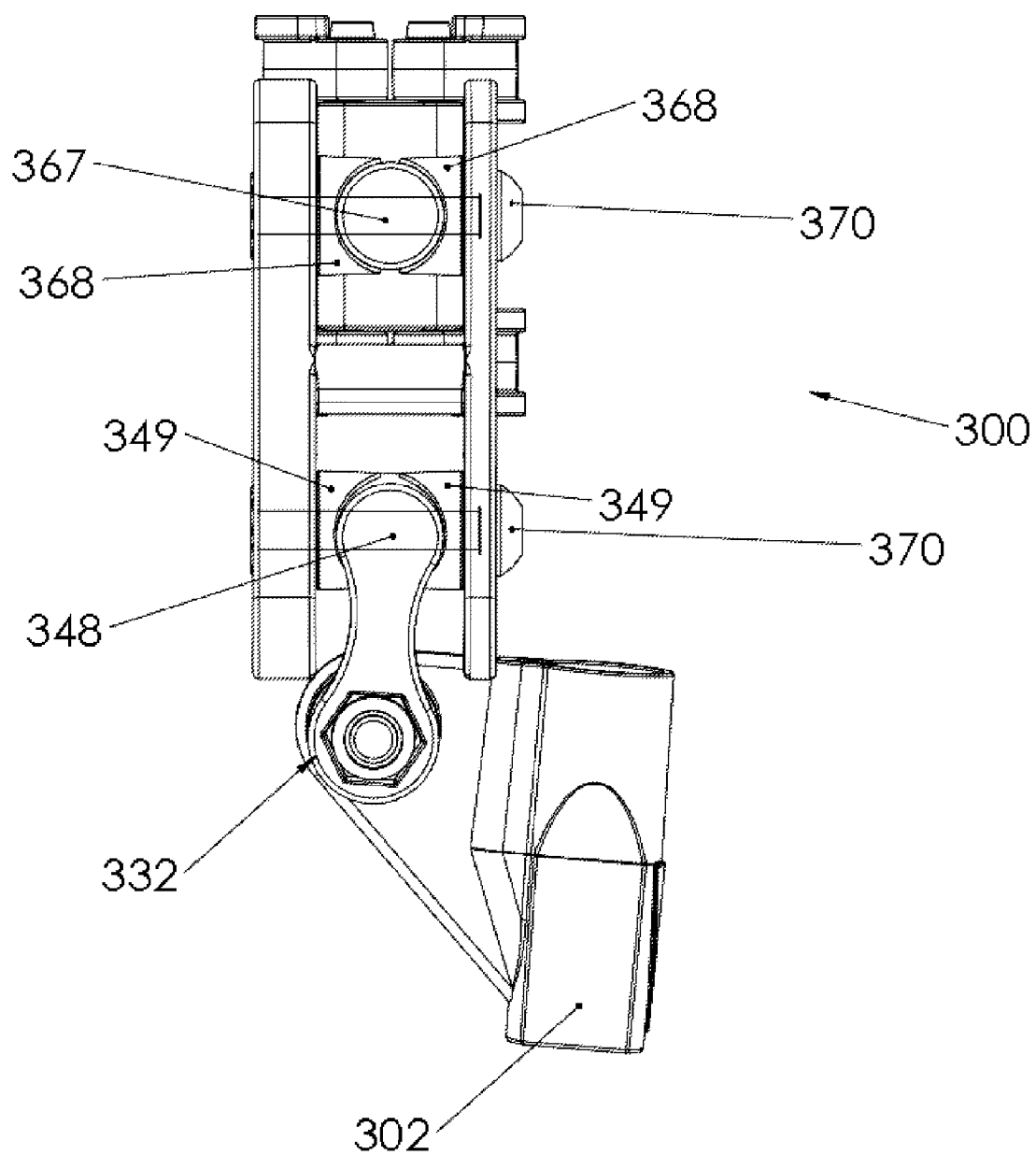
FIG. 20 shows a side-on view of the attachment of FIGS. 14 to 16.

The first joining portion 305 comprises a first portion 330 connected to the sensor housing 302 and a second portion 332 which is rotatable relative to the first portion 330 and is connected to the support arm 304 via a double-articulated joint 334. In this example, the first portion 330 is part of the sensor casing which is moulded in one piece with the sensor housing 302, although in other embodiments the first portion 330 could be a separate component which is joined to the sensor housing 302. As shown in FIG. 16, the double-articulated joint 334 permits rotation of the sensor housing 302 with respect to the support arm 304 about two different axes of rotation 340, 342 at right angles to each other. The joint 334 comprises a cylindrical portion 348 which is formed in one piece with the second portion 332 (in other embodiments the cylindrical portion 348 may be a separate component from the second portion 332). The cylindrical portion 348 rotates within two washers 349, which are attached to the sensor arm 304 using a bolt 370. As shown in FIG. 20, each of the washers 349 has an inner edge with a semi-circular profile when viewed from the side, so that the cylindrical portion 348 (and hence the rest of the second portion 332 and the sensor casing 302) can rotate within the washers 349 about axis of rotation 340. The washers 349 also rotate about the bolt 370 so that the sensor housing 302 can rotate about axis 342. A groove 344 in the support arm 304 also allows the double-articulated joint 334 to slide along the support arm 304, so that the sensor housing 302 can be moved backwards and forwards as well as rotated about the two axes 340, 342. Therefore, the sensor attachment 300 allows the sensor housing 302 to be moved with a large degree of flexibility to accommodate different positions of the gear sprockets 32 relative to the frame to which the sensor attachment 300 is to be attached. This allows the gear tooth sensor 65 to be connected to virtually any design of cycle 2.

FIG. 14 shows the sensor housing 302 in an in-use position in which it points forwards for sensing the motion of the gear sprockets 32. The first joining portion 305 has a retaining mechanism for resisting displacement of the sensor housing 302 to retain the sensor housing 302 in the in-use position even if the sensor housing is knocked. The retaining mechanism includes an internal spring (not visible in FIGS. 14 to 16), which acts in the direction 346 or 347 shown in FIG. 14 so as press the first portion 330 and second portion 332 of the first joining portion 305 against each other. For example, the spring may be wound round the bolt 353 coupling the first and second portions 330, 332 together and may be compressed within either the first or second portion 330, 332 to push it against the other of the first and second portions 330, 332. For example, if the spring is under compression in a cavity between the head of bolt 353 and the first portion 330, then by screwing the bolt 353 in or out the amount of compression of the spring can be adjusted and therefore the force with which the first and second portions 330, 332 are pressed together can be regulated. In other embodiments, the spring may be stretched so that the spring is under tension and tends to pull the first and second portions 330, 332 together.

Figure 19:
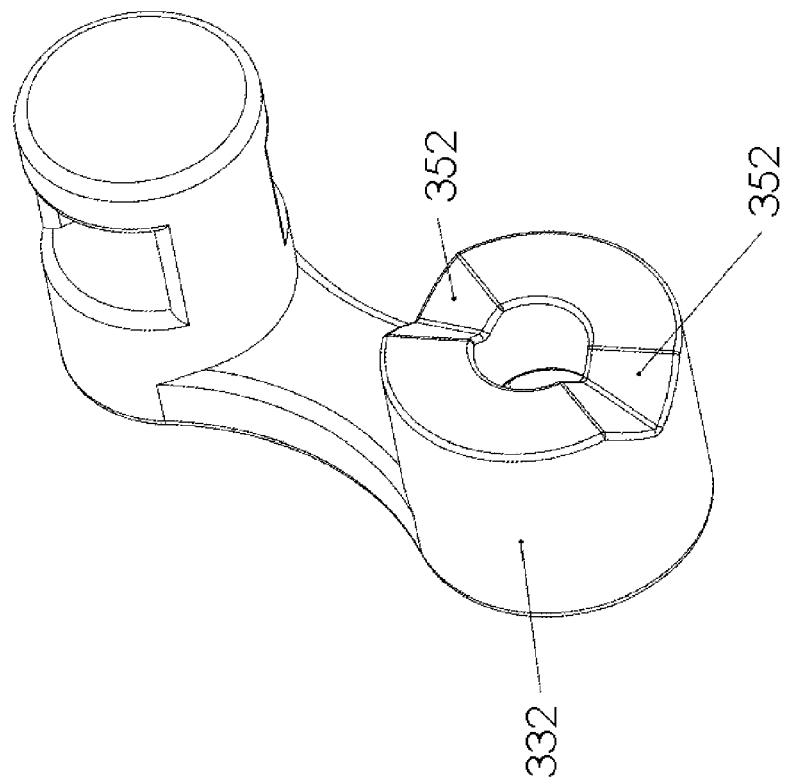
FIGS. 18 and 19 show first and second portions of a joint between a sensor housing and a support arm of the attachment of FIGS. 14 to 16.
Figure 18:
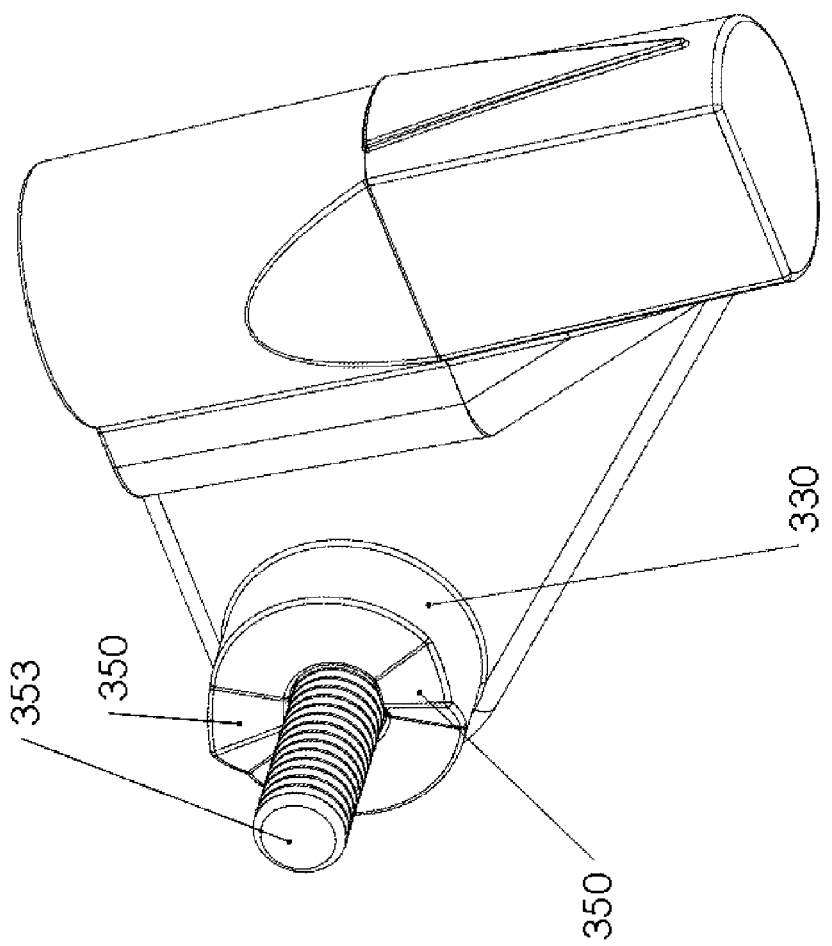

FIGS. 18 and 19 show the first and second portions 330, 332 of the first joining portion 305 in more detail. The first portion 330 comprises two V-shaped projections 350 which engage with corresponding V-shaped notches 352 in the second portion 332. In other examples, the notches 352 may be in the first portion 330 and the projection 350 may be in the second portion 332, or may have a different shape. Fewer or more than two notches and projections may be provided, or some other means of retaining the sensor housing 302 in the in-use position may be used.

When the sensor housing 302 is in the in-use position, the spring forces the first and second portions 330, 332 together, keeping the sensor housing 302 in the in-use position. If the sensor housing 302 starts to move away from the in-use position, for example if the sensor housing 302 is knocked or pushed a little in the direction 356 shown in FIG. 14, then the projections 350 start to move out of the notches 352, but the compression force of the spring pushing the first and second portions 330, 332 together will cause the projections 350 to move back down the slope of the notches 352 so that the sensor housing 302 returns to the in-use position. The V-shaped profile of the notches 350 and projections 352 together with the spring allow the attachment 300 to withstand knocks without the sensor housing 302 being displaced from the in-use position whilst allowing movement to prevent impact damage to the sensor 65.

If the sensor housing is knocked so far that the notches 350 move completely out of the projections 352, then the force of the spring pushes the first and second portions 330, 332 together so that the projection 350 of the first portion 330 pushes against a flat portion of the second portion 332 instead of the notch 352. This means that there will be a visible gap between the first and second portions 330, 332, and so it will be very clear to the user that the sensor housing 302 is not in the correct position and needs to be moved back to the in-use position where the projection 350 engages with the notch 352.

This retaining mechanism is useful because, for some designs of cycles (but not all cycles), the relative position of the frame and the gear sprockets may require the attachment 300 to be mounted in a position in which the sensor housing 302 is likely to be knocked, for example when removing the rear wheel 26 to repair a flat tyre. If the sensor housing 302 is knocked out of line, then this can cause incorrect sensing of the gear motion or damage to the sensor 65. The retaining mechanism retains the sensor housing 302 in the correct position even if the housing 302 is knocked slightly. If the housing 302 is knocked so far that the projection 350 is completely out of the notch 352, then the visible gap between the first and second portions 330, 332 will make it apparent to the user that there has been a knock and that the housing 302 will need to be moved back to the in-use position before further sensing (in contrast, if the retaining mechanism was not provided, then a slight knock of the sensor would cause a slight displacement of the sensor which might not be spotted by the user and could affect gear tooth sensing and result in damage to the sensor 65). For some designs of cycles, the user may choose to move the sensor housing 302 out of the in-use position deliberately as a precaution against knocks to the sensor, for example before removing the wheel 26.

The second joining portion 307 is similar to the first joining portion 305 in that it allows the support platform 306 to be rotated about two different axes of rotation 360, 362 relative to the support arm 304 and can also be slid laterally along the support arm within groove 364. As in the first joining portion 305, the second joining portion 307 has a cylindrical portion 367 which rotates about axis 360 within washers 368 which have an inner surface with a semi-circular shape when viewed side-on as in FIG. 20. The washers 368 also rotate about bolt 370 in axis 362 (see FIGS. 16 and 20). This provides further flexibility in positioning the sensor housing 302 relative to the frame of the cycle 2. Unlike the first joining portion 305, the second joining portion 307 does not have an internal spring or retaining mechanism.

As shown in FIG. 14, both the first joining portion 305 and second joining portion 307 are secured in position by bolts 370 which are fastened from the upper side of the sensor attachment 300. This makes it easier to adjust the attachment 300 because, when the attachment 300 is fastened to the cycle 2, the user's eyes and hands will typically be above the attachment 300 and, unlike bolts which need to be fastened sideways, this avoids reaching through the wheel 26 or drive components with screwdrivers or allen keys. Also, the nuts 372 which fasten on the end of the bolts 370 are retained by the grooves 344, 364 in the support arm 304 (see FIG. 16). This means that, when the heads of the bolts are adjusted with an allen key or screwdriver, the edges of the grooves 344, 364 prevent the nuts 372 from rotating so that the bolts 370 can be screwed in or out of the nuts 372 without needing to use a tool to hold the nuts 372. This makes it much easier to fit or adjust the attachment.

Figure 17:
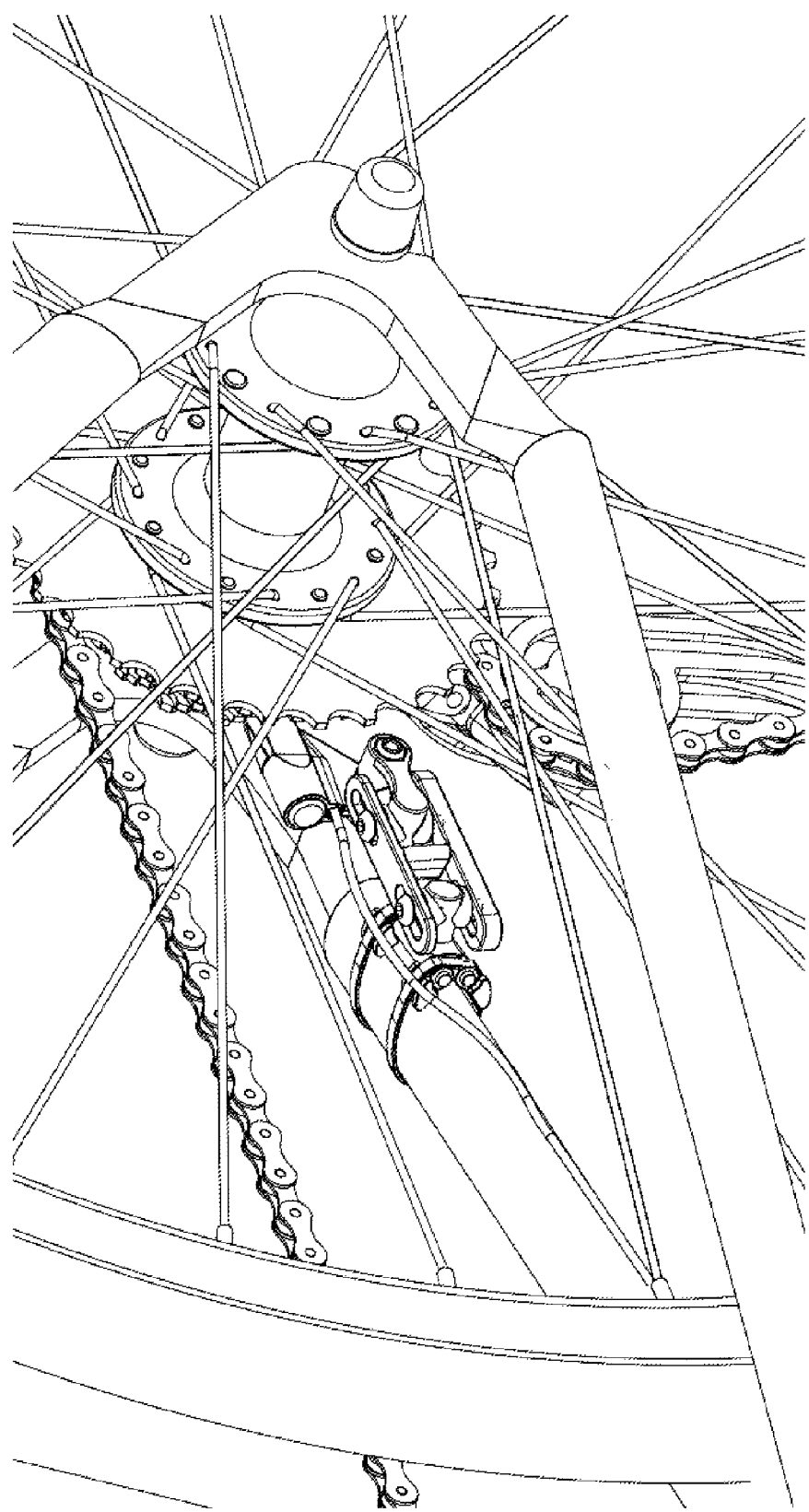
FIG. 17 illustrates the sensor attachment of FIGS. 14 to 16 when fitted to a pedal cycle.

FIG. 17 illustrates an example of the sensor attachment being mounted on the chain stay of the cycle frame. As in FIG. 8, flexible securing straps such as adjustable cable ties are wrapped around the gripping members, passing through grooves in the gripping members, to secure the attachment to the chain stay. Adjustable cable ties are useful since they allow the attachment to be removed or adjusted without having to cut the cable ties and replace them with new ones. The joining portions 305, 307 of the attachment 300 can be adjusted to place the sensor housing in the vicinity of the rear sprocket.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

CLAUSES

The following clauses define further example embodiments of the invention and further features which may be combined with features of the claims.

1. An electrically assisted cycle kit for fitting to a pedal cycle, the kit comprising:
    an electric motor for assisting pedal cycle motion of the pedal cycle;
    a battery for powering the electric motor;
    a gear tooth sensor for providing a gear motion signal indicative of at least one of a speed of motion and an acceleration of motion of gear teeth and valleys of a gear sprocket of the pedal cycle relative to the gear tooth sensor; and
    a controller for controlling the drive of the electric motor in dependence on the gear motion signal provided by the gear tooth sensor.
2. The electrically assisted cycle kit according to clause 1, wherein the gear tooth sensor comprises a magnetic sensor for sensing ferrous gear teeth of the gear sprocket.
3. The electrically assisted cycle kit according to any of clause 1 and 2, wherein the controller is configured to control the drive speed of the electric motor in dependence on the gear motion signal provided by the gear tooth sensor.
4. The electrically assisted cycle kit according to any preceding clause, wherein the gear tooth sensor is configured to provide a gear motion signal which is indicative of a direction of rotation of the gear sprocket; and
    the controller is configured to control the drive of the electric motor in dependence on the direction of rotation indicated by the gear motion signal.
5. The electrically assisted cycle kit according to clause 4, wherein the gear tooth sensor comprises at least a first sensor and a second sensor spaced apart from one another for sensing motion of the gear teeth and valleys of the gear sprocket; and
    the controller is configured to detect the direction of rotation of the gear sprocket based on the sensing of the at least two sensors.
6. The electrically assisted cycle kit according to any preceding clause, wherein the controller is configured to start the drive of the electric motor in response to detecting a drive start condition based on the gear motion signal;
    the drive start condition including at least one of:
    (i) detecting forward rotation of the gear sprocket;
    (ii) after determining the direction of rotation of the gear sprocket at A instances over a period of operation, detecting forward rotation of the gear sprocket for at least B of the A instances, where A and B are integers and A>B;
    (iii) detecting that the speed of motion of the gear teeth and valleys is greater than a start threshold speed;
    (iv) after determining the speed of motion of the gear teeth and valleys at C instances over a period of operation, detecting that the speed of motion of the gear teeth and valleys is greater than a start threshold speed for at least D of the C instances, where C and D are integers and C>D; and
    (v) detecting acceleration of motion of the gear teeth and valleys.
7. The electrically assisted cycle kit according to any preceding clause, wherein the controller is configured to stop the drive of the electric motor in response to detecting a drive stop condition based on the gear motion signal; the drive stop condition including at least one of:
    (i) detecting backward rotation of the gear sprocket;
    (ii) after determining the direction of rotation of the gear sprocket at W instances over a period of operation, detecting backward rotation of the gear sprocket for at least X of the W instances, where W and X are integers and W>X;
    (iii) detecting that the speed of motion of the gear teeth and valleys has dropped to a stop threshold speed;
    (iv) after determining the speed of motion of the gear teeth and valleys at Y instances over a period of operation, detecting that the speed of motion of the gear teeth and valleys has dropped to a stop threshold speed for at least Z of the Y instances, where Y and Z are integers and Y>Z; and
    (v) detecting deceleration of motion of the gear teeth and valleys.

8. The electrically assisted cycle kit according to any preceding clause, wherein the gear tooth sensor is configured to generate an oscillating gear motion signal in response to motion of the gear teeth and valleys relative to the gear tooth sensor; and
the controller is configured to determine at least one of the speed of motion and the acceleration of motion of the gear teeth and valleys in dependence on an oscillation period or oscillation frequency of the gear motion signal.

9. The electrically assisted cycle kit according to any preceding clause, comprising a sensing target for attaching to a rotating element of the pedal cycle; and
a proximity sensor for providing a proximity signal in response to sensing proximity of the sensing target to the proximity sensor.

10. The electrically assisted cycle kit according to clause 9, wherein the controller is configured to determine a number of teeth of the gear sprocket corresponding to a full rotation of the rotating element in dependence on the proximity signal provided by the proximity sensor and the gear motion signal provided by the gear tooth sensor.

11. The electrically assisted cycle kit according to any of clauses 9 and 10, wherein the controller is configured to determine a speed of the pedal cycle in dependence on the proximity signal provided by the proximity sensor.

12. The electrically assisted cycle kit according to any preceding clause, wherein the controller is configured to determine a speed of the pedal cycle, and is configured to reduce the drive of the electric motor in response to detecting that the speed of the pedal cycle has risen to a threshold speed.

13. The electrically assisted cycle kit according to any preceding clause, comprising attachments for attaching the motor, the battery, the gear tooth sensor and the controller to the pedal cycle.

14. The electrically assisted cycle kit according to any preceding clause, comprising a sensor attachment for attaching the gear tooth sensor to a frame of the pedal cycle.

15. The electrically assisted cycle kit according to clause 14, wherein the sensor attachment comprises:
a sensor housing configured to house the gear tooth sensor;
a support platform for attaching to the frame of the pedal cycle; and
a support arm for connecting the sensor housing to the support platform.

16. The electrically assisted cycle kit according to clause 15, wherein the support arm is adjustable to permit at least one of:
rotation of the sensor housing relative to the support arm;
sliding of the sensor housing along the support arm;
rotation of the support platform relative to the support arm; and
sliding of the support platform along the support arm.

17. The electrically assisted cycle kit according to any of clauses 15 and 16, wherein the support platform comprises a base portion for attaching to the frame of the pedal cycle and a pivoting portion for connecting to the support arm, wherein the pivoting portion is pivotable relative to the base portion.

18. The electrically assisted cycle kit according to any of clauses 14 to 17, wherein the sensor attachment comprises a plurality of pivotable gripping members having a gripping surface for gripping the frame.

19. The electrically assisted cycle kit according to clause 18, wherein the gripping surface of the gripping members is concave.

20. The electrically assisted cycle kit according to any of clauses 18 and 19, wherein at least the gripping surface of the gripping members is made from a slip-resistant material.

21. The electrically assisted cycle kit according to any of clauses 18 to 20, wherein a non-gripping surface of the gripping members comprises a groove for accommodating a securing strap.

22. The electrically assisted cycle kit according to any of clauses 1 to 13, comprising a sensor attachment for attaching the gear tooth sensor to a rear axle of the pedal cycle.

23. The electrically assisted cycle kit according to clause 22, wherein the sensor attachment comprises:
a sensor housing configured to house the gear tooth sensor;
a support hook or ring for attaching round the rear axle; and
an arm connecting the sensor housing to the support hook or ring.

24. A pedal cycle fitted with an electrically assisted cycle kit according to any preceding claim.

25. The pedal cycle according to clause 24, wherein the gear tooth sensor is fitted to a chain stay of the pedal cycle.

26. The pedal cycle according to any of clauses 24 and 25, wherein the gear tooth sensor is configured to sense the motion of the gear teeth and valleys of a rear sprocket of the pedal cycle relative to the gear tooth sensor.

27. The pedal cycle according to any of clauses 24 to 26, wherein the gear tooth sensor is configured to sense the motion of the gear teeth and valleys of a front sprocket of the pedal cycle relative to the gear tooth sensor.

28. A method of fitting an electrically assisted cycle kit to a pedal cycle, the method comprising:
attaching an electric motor to the pedal cycle for assisting pedal cycle motion of the pedal cycle;
attaching a gear tooth sensor to the pedal cycle for providing a gear motion signal indicative of at least one of a speed of motion and an acceleration of motion of gear teeth and valleys of a gear sprocket of the pedal cycle relative to the gear tooth sensor;
attaching a controller to the pedal cycle and connecting the controller to the electric motor and the gear tooth sensor for controlling the drive of the electric motor in dependence on the gear motion signal provided by the gear tooth sensor; and
attaching a battery to the pedal cycle and connecting the battery for powering the electric motor, the gear tooth sensor and the controller.

29. An attachment for attaching an object to a pedal cycle, comprising a support platform for attaching to a frame of the pedal cycle, wherein the object is connectable to the support platform;
wherein the support platform comprises a plurality of pivotable gripping members, the gripping members having a gripping surface for gripping the frame of the pedal cycle and a non-gripping surface comprising a groove for accommodating a securing strap.

30. The attachment according to clause 29, comprising a support arm for connecting the object to the support platform.

31. The attachment according to clause 30, wherein the support arm is adjustable to permit at least one of:
rotation of the object relative to the support arm;
sliding of the object along the support arm;
rotating of the support platform relative to the support arm; and
sliding of the support platform along the support arm.

32. The attachment according to any of clauses 29 to 31, wherein the support platform comprises a base portion for attaching to the frame of the pedal cycle and a pivoting platform for connecting to the object, wherein the pivoting platform is pivotable relative to the base portion.

33. The attachment according to any of clauses 29 to 32, wherein the gripping surface of the gripping members is concave.

34. The attachment according to any of clauses 29 and 33, wherein at least the gripping surface of the gripping members is made from a slip-resistant material.

The invention claimed is:

1. An electrically assisted cycle kit for fitting to a pedal cycle to convert the pedal cycle into an electrically assisted pedal cycle, the electrically assisted cycle kit comprising:
   an electric motor for assisting pedal cycle motion of the pedal cycle;
   a battery for powering the electric motor;
   a gear tooth sensor for providing a gear motion signal indicative of at least one of (i) a speed of motion of gear teeth and valleys of an existing rear sprocket of the pedal cycle relative to the gear tooth sensor, said existing rear sprocket not provided in said electrically assisted cycle kit, and (ii) an acceleration of motion of the gear teeth and valleys of the existing rear sprocket of the pedal cycle relative to the gear tooth sensor; and
   a controller for controlling a drive of the electric motor in dependence on the gear motion signal provided by the gear tooth sensor.

2. The electrically assisted cycle kit according to claim 1, wherein the controller is configured to stop the drive of the electric motor in response to detecting slowing of pedaling based on the gear motion signal provided by the gear tooth sensor, without using a brake sensor for sensing actuation of brake levers.

3. The electrically assisted cycle kit according to claim 1, wherein the gear tooth sensor is configured to provide the gear motion signal which is indicative of a direction of rotation of the existing rear sprocket; and
   the controller is configured to control the drive of the electric motor in dependence on the direction of rotation indicated by the gear motion signal.

4. The electrically assisted cycle kit according to claim 3, wherein the gear tooth sensor comprises at least a first sensor and a second sensor spaced apart from one another for sensing motion of the gear teeth and valleys of the rear sprocket; and
   the controller is configured to detect the direction of rotation of the existing rear sprocket based on the sensing of said at least a first sensor and a second sensor.

5. The electrically assisted cycle kit according to claim 1, wherein the controller is configured to stop the drive of the electric motor in response to detecting deceleration of rotation of the existing rear sprocket based on the gear motion signal provided by the gear tooth sensor.

6. The electrically assisted cycle kit according to claim 1, comprising a sensor attachment for attaching the gear tooth sensor to a chain stay or rear axle of the pedal cycle.

7. The electrically assisted cycle kit according to claim 1, comprising a sensor attachment for attaching the gear tooth sensor to the pedal cycle, wherein the sensor attachment comprises:
   a sensor housing configured to house the gear tooth sensor;
   a support platform for attaching to a frame of the pedal cycle; and
   a support arm for connecting the sensor housing to the support platform.

8. The electrically assisted cycle kit according to claim 7, wherein the sensor attachment comprises a plurality of gripping members having a gripping surface for gripping the frame.

9. The electrically assisted cycle kit according to claim 8, wherein at least the gripping surface of the plurality of gripping members is made from a slip-resistant material.

10. The electrically assisted cycle kit according to claim 7, wherein the sensor attachment comprises a retaining mechanism configured to resist displacement of the sensor housing to retain the sensor housing in an in-use position.

11. The electrically assisted cycle kit according to claim 7, wherein at least one of the sensor housing and the support platform is coupled to the support arm via a joining portion allowing said at least one of the sensor housing and the support platform to be rotated relative to the support arm about at least two different axes of rotation.

12. The electrically assisted cycle kit according to claim 7, wherein the support arm comprises parallel support bars, at least one of the sensor housing and the support platform is coupled to the support arm via a joining portion fastened between the parallel support bars by a bolt, and a nut for fastening the bolt is held by the support arm to prevent rotation of the nut as the bolt is adjusted.

13. The electrically assisted cycle kit according to claim 7, wherein the sensor housing is coupled to the support arm via a joining portion comprising a first portion connected to the sensor housing, a second portion connected to the support arm, wherein the first portion and the second portion are pressed together; and
   one of the first portion and the second portion comprises a notch and another of the first portion and the second portion comprises a projection for engaging with the notch.

14. The electrically assisted cycle kit according to claim 13, wherein the second portion is rotatable relative to the first portion.

15. An electrically assisted cycle kit for fitting to a pedal cycle, the electrically assisted cycle kit comprising:
   an electric motor for assisting pedal cycle motion of the pedal cycle;
   a battery for powering the electric motor;
   a gear tooth sensor for providing a gear motion signal indicative of at least one of (i) a speed of motion of gear teeth and valleys of a gear sprocket of the pedal cycle relative to the gear tooth sensor, and (ii) an acceleration of motion of the gear teeth and valleys of the gear sprocket of the pedal cycle relative to the gear tooth sensor; and
   a controller for controlling a drive of the electric motor in dependence on the gear motion signal provided by the gear tooth sensor;
   wherein the controller is configured to determine a ground speed of the pedal cycle from the gear motion signal provided by said gear tooth sensor also used by the controller for controlling the drive of the electric motor.

16. The electrically assisted cycle kit according to claim 15, wherein the controller is configured to reduce the drive of the electric motor in response to detecting that the ground speed of the pedal cycle has risen to a threshold speed.

17. The electrically assisted cycle kit according to claim 15, wherein the controller is configured to determine a number of teeth of the gear sprocket corresponding to a full rotation of a rotating element of the pedal cycle; and
   the controller is configured to determine the ground speed of the pedal cycle in dependence on the gear motion signal and the number of teeth of the gear sprocket.

18. The electrically assisted cycle kit according to claim 17, wherein the controller is configured to determine the number of teeth based on:
(i) motor data provided by the electric motor; or
(ii) a proximity signal provided by a proximity sensor.

19. An attachment for attaching an object to a pedal cycle, comprising a support platform for attaching to a frame of the pedal cycle and a support arm for connecting the object to the support platform;
  wherein the object is connected to the support arm via a joining portion comprising a first portion connected to the object and a second portion connected to the support arm, wherein a first side of the first portion and a second side of the second portion are pressed against each other; and
  one of said first side of the first portion and said second side of the second portion comprises a notch, and another of said first side of the first portion and said second side of the second portion comprises a projection for engaging with the notch.

20. A method of fitting an electrically assisted cycle kit to a pedal cycle, the method comprising:

attaching an electric motor to the pedal cycle for assisting pedal cycle motion of the pedal cycle;

attaching a gear tooth sensor to the pedal cycle for providing a gear motion signal indicative of at least one of (i) a speed of motion of gear teeth and valleys of an existing rear sprocket of the pedal cycle relative to the gear tooth sensor, said existing rear sprocket not provided in the electrically assisted cycle kit, and (ii) an acceleration of motion of the gear teeth and valleys of the existing rear sprocket of the pedal cycle relative to the gear tooth sensor;

attaching a controller to the pedal cycle and connecting the controller to the electric motor and the gear tooth sensor for controlling the drive of the electric motor in dependence on the gear motion signal provided by the gear tooth sensor; and attaching a battery to the pedal cycle and connecting the battery for powering the electric motor, the gear tooth sensor and the controller.

* * * * *